US010644732B2

(12) United States Patent
Raghavan et al.

(10) Patent No.: US 10,644,732 B2
(45) Date of Patent: May 5, 2020

(54) SYSTEMS AND METHODS FOR SIGNALING INCORPORATING INTERFERENCE AVOIDANCE OR BEAM NULLING CONSTRAINTS FOR MILLIMETER WAVE COMMUNICATION SYSTEMS

(71) Applicant: QUALCOMM INCORPORATED, San Diego, CA (US)

(72) Inventors: Vasanthan Raghavan, West Windsor Township, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/118,871

(22) Filed: Aug. 31, 2018

(65) Prior Publication Data

US 2019/0074854 A1 Mar. 7, 2019

Related U.S. Application Data

(60) Provisional application No. 62/554,124, filed on Sep. 5, 2017.

(51) Int. Cl.
H04B 1/04 (2006.01)
H04W 52/42 (2009.01)
(Continued)

(52) U.S. Cl.
CPC ......... H04B 1/0475 (2013.01); H04B 1/3838 (2013.01); H04B 7/0426 (2013.01);
(Continued)

(58) Field of Classification Search
CPC ............................ H04B 1/0475; H04B 1/0745
See application file for complete search history.

(56) References Cited

U.S. PATENT DOCUMENTS

2014/0328423 A1* 11/2014 Agee ................... H04B 7/0413
375/267
2016/0315745 A1* 10/2016 Kim .................... H04B 7/0469
(Continued)

FOREIGN PATENT DOCUMENTS

EP 3174216 A1 5/2017

OTHER PUBLICATIONS

Huawei et al., "Closed-Loop Coordinated Transmission Scheme", 3GPP Draft; R1-1611673, 3rd Generation Partnership Project (3GPP), Mobile Competence Centre, 650, Route Des Lucioles, F-06921 Sophia-Antipolis Cedex, -France, vol. RAN WG1, No. Reno, USA; Nov. 14, 2016-Nov. 18, 2016 Nov. 13, 2016, XP051175645, Retrieved from the, Internet: URL:http://www.3gpp.org/ftp/Meetings_3GPP_SYNC/RAN1/Docs/ [retrieved on Nov. 13, 2016], 6 pages.
(Continued)

*Primary Examiner* — Joshua L Schwartz
(74) *Attorney, Agent, or Firm* — Smith Tempel Blaha

(57) ABSTRACT

A method for communication includes determining unintended beam direction information based on at least one of a location of a device that may be affected by energy emitted from a communication device, or an output power level allowed to radiate from the communication device, and limiting radiation of a communication beam from the communication device in a direction based on the unintended beam direction information.

18 Claims, 22 Drawing Sheets

(51) Int. Cl.
*H04B 1/3827* (2015.01)
*H04B 7/06* (2006.01)
*H04W 52/24* (2009.01)
*H04B 7/0426* (2017.01)

(52) U.S. Cl.
CPC ......... *H04B 7/0617* (2013.01); *H04B 7/0619* (2013.01); *H04W 52/245* (2013.01); *H04W 52/42* (2013.01); *H04W 52/243* (2013.01)

(56) References Cited

U.S. PATENT DOCUMENTS

2017/0251460 A1* 8/2017 Agiwal ............. H04W 72/0406
2018/0035438 A1* 2/2018 Pao ................... H04W 72/0413

OTHER PUBLICATIONS

International Search Report and Written Opinion—PCT/US2018/049310—ISA/EPO—dated Nov. 28, 2018.

* cited by examiner

FIG. 12B Definition of spherical coordinates and unit vectors in both the GCS and LCS.

FIG. 12A Orienting the LCS (blue) with respect to the GCS (gray) by a sequence of 3 rotations: $\alpha, \beta, \gamma$.

US 10,644,732 B2

SYSTEMS AND METHODS FOR SIGNALING INCORPORATING INTERFERENCE AVOIDANCE OR BEAM NULLING CONSTRAINTS FOR MILLIMETER WAVE COMMUNICATION SYSTEMS

RELATED APPLICATIONS

This application claims priority to and the benefit of U.S. Provisional Patent Application No. 62/554,124, entitled "SYSTEMS AND METHODS FOR SIGNALING INCORPORATING INTERFERENCE AVOIDANCE OR BEAM NULLING CONSTRAINTS FOR MILLIMETER WAVE COMMUNICATION SYSTEMS," filed Sep. 5, 2017, the contents of which are hereby incorporated herein by reference in its entirety as if fully set forth below and for all applicable purposes.

TECHNICAL FIELD

The technology discussed below relates to wireless communication systems, and more particularly to signaling systems and methods for interference avoidance. Embodiments enable and provide systems and methods for interference avoidance for communication systems that employ millimeter wave (MMW) communication beam steering.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). An example of an advancement to LTE technology is referred to as 5G or new radio (NR). The terms 5G and NR represents an advancement of LTE technology including, for example, various advancements to the wireless interface, processing improvements, and the enablement of higher bandwidth to provide additional features and connectivity.

By way of example, a wireless multiple-access communication system may include a number of base stations, each simultaneously supporting communication for multiple communication devices, otherwise known as user equipments (UEs). A base station may communicate with UEs on downlink channels (e.g., for transmissions from a base station to a UE) and uplink channels (e.g., for transmissions from a UE to a base station). UEs may locate a base station by detecting synchronization signal(s) from which the UEs acquire the base station identification code (cell ID), system timing information, frame alignment information, etc. In systems where the receiver is highly signal strength and noise limited (e.g., millimeter wave systems), beamformed synchronization signals may be swept across the cell coverage area to provide coverage enhancement to improve detection.

BRIEF SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the disclosure provides a method for communication including determining unintended beam direction information based on at least one of a location of a device that may be affected by energy emitted from a communication device, or an output power level allowed to radiate from the communication device. The method includes limiting radiation of a communication beam from the communication device in a direction based on the unintended beam direction information.

Another aspect of the disclosure provides a method for communication including receiving unintended beam direction information based on at least one of a location of a device that may be affected by energy emitted from a communication device, or an output power level allowed to radiate from the communication device. The method includes limiting radiation of a communication beam from the communication device in a direction based on the unintended beam direction information.

Another aspect of the disclosure provides a communication device including a processor, memory coupled with the processor, and instructions stored in the memory and operable, when executed by the processor, to cause the communication device to determine unintended beam direction information based on at least one of a location of a device that may be affected by energy emitted from the communication device, or an output power level allowed to radiate from the communication device, and limit radiation of a communication beam from the communication device in a direction based on the unintended beam direction information.

Another aspect of the disclosure provides a system for communication including a user equipment (UE) having a processor and a memory, the UE configured to receive unintended beam direction information based on at least one of a location of a device that may be affected by energy emitted from the UE, or an output power level allowed to radiate from the UE. The UE is configured to limit radiation of a communication beam from the UE in a direction based on the unintended beam direction information.

Another aspect of the disclosure provides a device for communication, including means for determining unintended beam direction information based on at least one of a location of a device that may be affected by energy emitted from the communication device, or an output power level allowed to radiate from the communication device, and means for limiting radiation of a communication beam from the communication device in a direction based on the unintended beam direction information.

Another aspect of the disclosure provides a method for communication including determining unintended beam direction information, and communicating the unintended beam direction information from a base station to a user equipment (UE).

Another aspect of the disclosure provides a method for communication including determining one or more of an unintended communication beam direction and an allowable power level from an internal sensor associated with a user equipment (UE) based at least in part on a maximum permissible exposure (MPE) constraint.

Another aspect of the disclosure provides a method for communication including a user equipment (UE) determining unintended beam direction information; and an allowable power level, the UE determining an intended beam direction, and the UE developing a communication beam via an online beam design optimization criterion.

Another aspect of the disclosure provides a system for communication including a base station configured to determine unintended beam direction information, and the base station configured to communicate the unintended beam direction information to a user equipment (UE).

Another aspect of the disclosure provides a system for communication including a user equipment (UE) configured to determine one or more of an unintended communication beam direction and an allowable power level from an internal sensor associated with the UE based at least in part on a maximum permissible exposure (MPE) constraint.

Another aspect of the disclosure provides a system for communication including a user equipment (UE) configured to determine unintended beam direction information, and an allowable power level, the UE configured to determine an intended beam direction, the UE configured to develop a communication beam via an online beam design optimization criterion.

Another aspect of the disclosure provides a device for communication including means for determining unintended beam direction information, and means for communicating the unintended beam direction information from a base station to a user equipment (UE).

Another aspect of the disclosure provides a device for communication including means for determining one or more of an unintended communication beam direction and an allowable power level from an internal sensor associated with a user equipment (UE) based at least in part on a maximum permissible exposure (MPE) constraint.

Another aspect of the disclosure provides a device for communication including means for determining unintended beam direction information, and an allowable power level, means for determining an intended beam direction, and means for developing a communication beam via an online beam design optimization criterion.

Another aspect of the disclosure provides a non-transitory computer-readable medium storing computer executable code for communication, the code executable by a processor to determine unintended beam direction information, and communicate the unintended beam direction information from a base station to a user equipment (UE).

Another aspect of the disclosure provides a non-transitory computer-readable medium storing computer executable code for communication, the code executable by a processor to determine one or more of an unintended communication beam direction and an allowable power level from an internal sensor associated with a user equipment (UE) based at least in part on a maximum permissible exposure (MPE) constraint.

Another aspect of the disclosure provides a non-transitory computer-readable medium storing computer executable code for communication, the code executable by a processor to determine unintended beam direction information, and an allowable power level, determine an intended beam direction, and develop a communication beam via an online beam design optimization criterion.

BRIEF DESCRIPTION OF THE DRAWINGS

In the figures, like reference numerals refer to like parts throughout the various views unless otherwise indicated. For reference numerals with letter character designations such as "102a" or "102b", the letter character designations may differentiate two like parts or elements present in the same figure. Letter character designations for reference numerals may be omitted when it is intended that a reference numeral encompass all parts having the same reference numeral in all figures.

DETAILED DESCRIPTION

Figure 1:
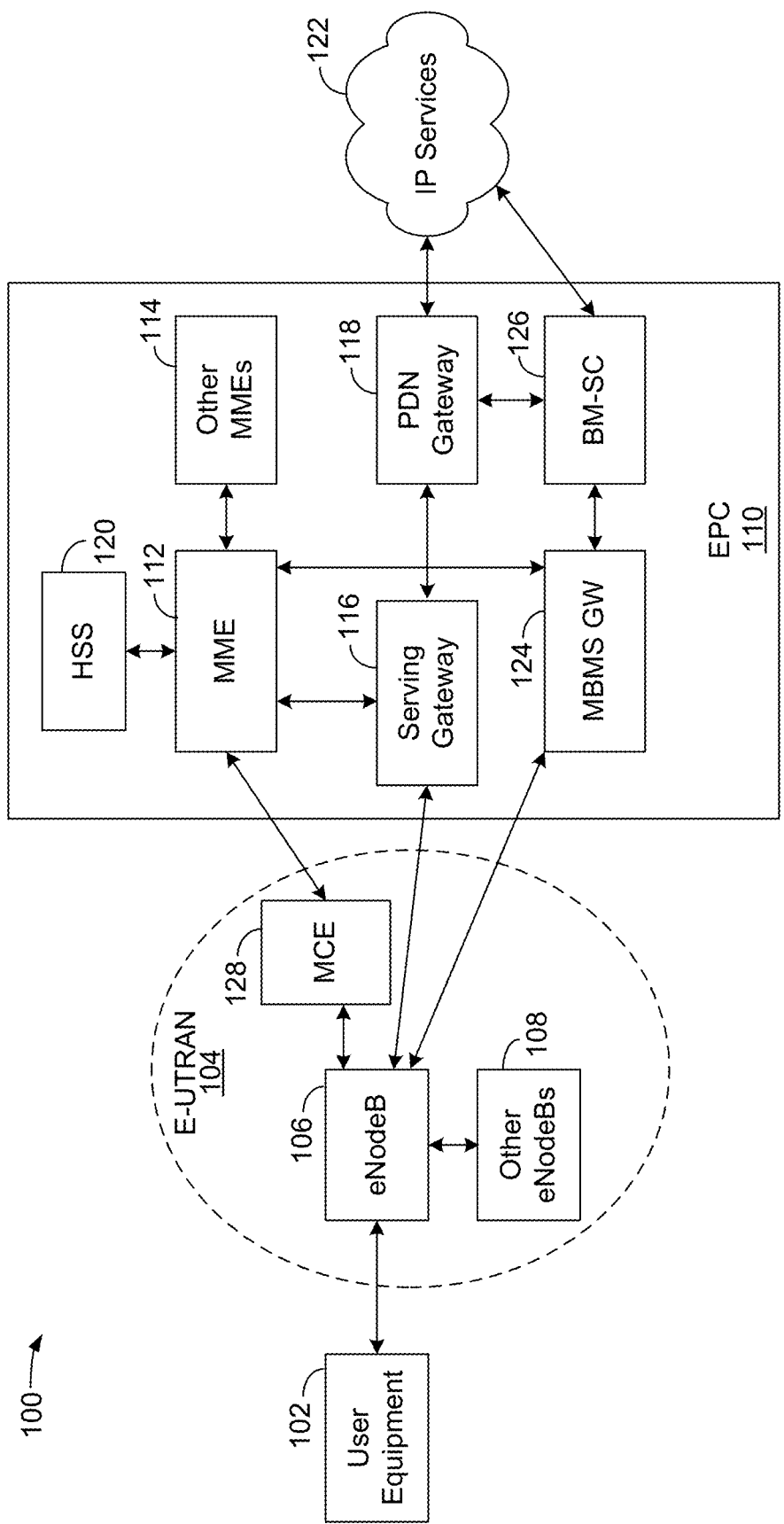
FIG. 1 is a diagram illustrating an example of a network architecture, in accordance with various aspects of the present disclosure.

The word "exemplary" is used herein to mean "serving as an example, instance, or illustration." Any aspect described herein as "exemplary" is not necessarily to be construed as preferred or advantageous over other aspects.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Exemplary embodiments of the disclosure are directed to beamforming systems generally used in millimeter wave communication systems where it is desirable to avoid interfering with devices other than the intended communication device. In an exemplary embodiment, a base station and a UE may communicate using directional communication beams. However, if there are devices in the vicinity other than the base station and the UE, it is desirable to avoid interfering with that device. In an exemplary embodiment, the base station and the UE communicate over one or more communication beams that are designed to avoid projecting energy beyond a certain power level in a particular direction. In an exemplary embodiment, communication beam side lobe suppression prevents or at least limits an amount of energy from being transmitted toward a device other than the intended base station or UE. In another exemplary embodiment, the maximum permissible exposure (MPE) level of a communication beam is controlled so that the communication beam does not transmit energy above a certain power level in a particular direction. In another exemplary embodiment, the radio frequency (RF) power consumption of a communication beam is used to limit the number of antennas or antenna elements used in creating a beam to steer energy in a particular direction.

Embodiments described herein include determining directions to avoid, and power levels not to be exceeded when developing a communication beam, and include controlling the direction of a communication beam, and the amount of power projected by a communication beam in a particular direction.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, and an Operator's Internet Protocol (IP) Services 122. The EPS 100 can interconnect with other access networks, but for simplicity those entities/interfaces are not shown. As shown, the EPS 100 provides packet-switched services; however, as those skilled in the art will readily appreciate, the various concepts presented throughout this disclosure may be extended to networks providing circuit-switched services. Moreover, while an LTE network is illustrated as an example, other types of networks may also be used, including, for example only, a 5G network.

The E-UTRAN 104 includes a base station, such as, for example, the evolved Node B (eNB) 106 and other eNBs 108, which may include a gNodeB (gNB), a Home NodeB, a Home eNodeB, or a base station using some other suitable terminology. For example, in 5G or New Radio (NR) networks, a base station may be referred to as a gNB. The E-UTRAN 104 may also include a Multicast Coordination Entity (MCE) 128. The eNB 106 provides user and control planes protocol terminations toward the UE 102. The eNB 106 may be connected to the other eNBs 108 via a backhaul (e.g., an X2 interface). The MCE 128 allocates time/frequency radio resources for evolved Multimedia Broadcast Multicast Service (MBMS) (eMBMS), and determines the radio configuration (e.g., a modulation and coding scheme (MCS)) for the eMBMS. The MCE 128 may be a separate entity or part of the eNB 106. The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, a drone, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, a Home Subscriber Server (HSS) 120, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 and the BM-SC 126 are connected to the IP Services 122. The IP Services 122 may include the Internet, an intranet, an IP Multimedia Subsystem (IMS), a PS Streaming Service (PSS), and/or other IP services. The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
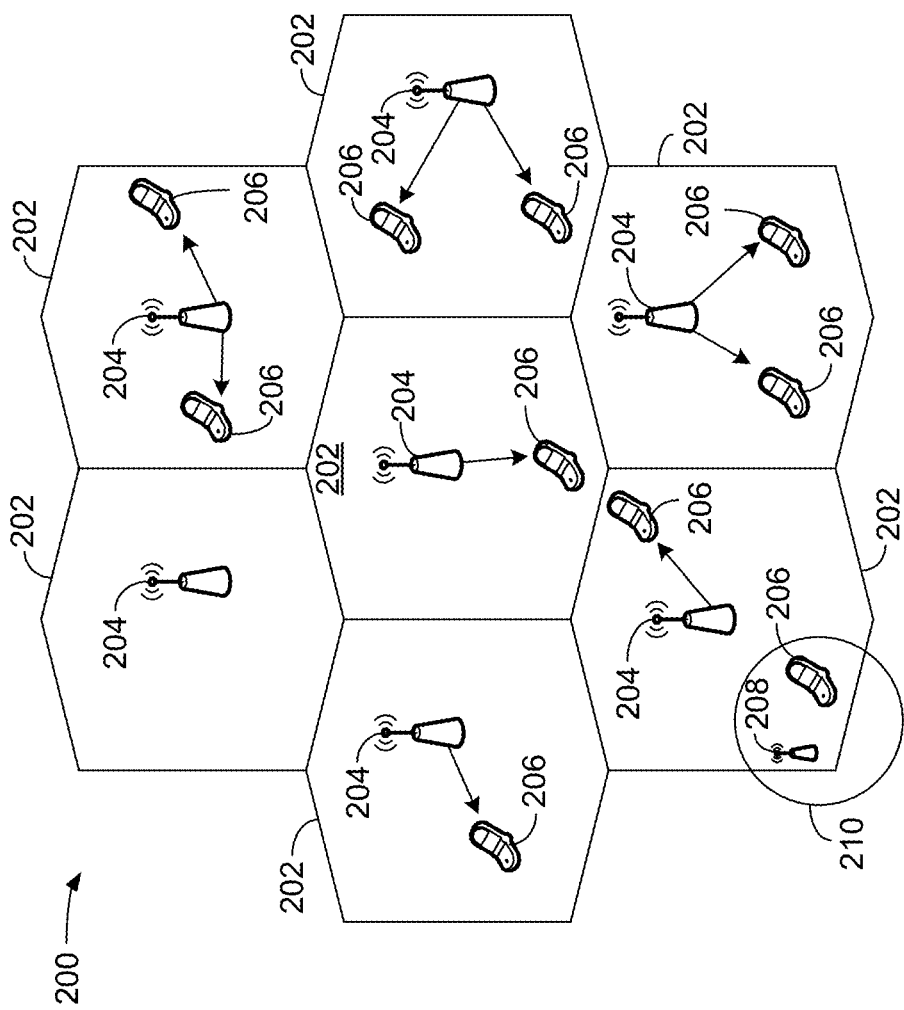
FIG. 2 is a diagram illustrating an example of an access network, in accordance with various aspects of the present disclosure.

FIG. 2 is a diagram illustrating an example of an access network 200 in an LTE network architecture. In this example, the access network 200 is divided into a number of cellular regions (cells) 202. One or more lower power class eNBs/gNBs 208 may have cellular regions 210 that overlap with one or more of the cells 202. The lower power class eNB/gNB 208 may be a femto cell (e.g., home eNB (HeNB)), pico cell, micro cell, or remote radio head (RRH). The macro eNBs/gNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs/gNBs 204 are responsible for all radio related functions including radio bearer control, admission control, mobility control, scheduling, security, and connectivity to the serving gateway 116. An eNB/gNB may support one or multiple (e.g., three) cells (also referred to as a sectors). The term "cell" can refer to the smallest coverage area of an eNB/gNB and/or an eNB/gNB subsystem serving a particular coverage area. Further, the terms "eNB," "gNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO), Ultra Mobile Broadband (UMB), 5G, or other modulation and multiple access techniques. EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs/gNBs 204 may have multiple antennas supporting MIMO technology. The use of MIMO technology enables the eNBs/gNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB/gNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-HWA in the form of a DFT-spread OFDM signal to compensate for high peak-to-average power ratio (PAPR).

Figure 3:
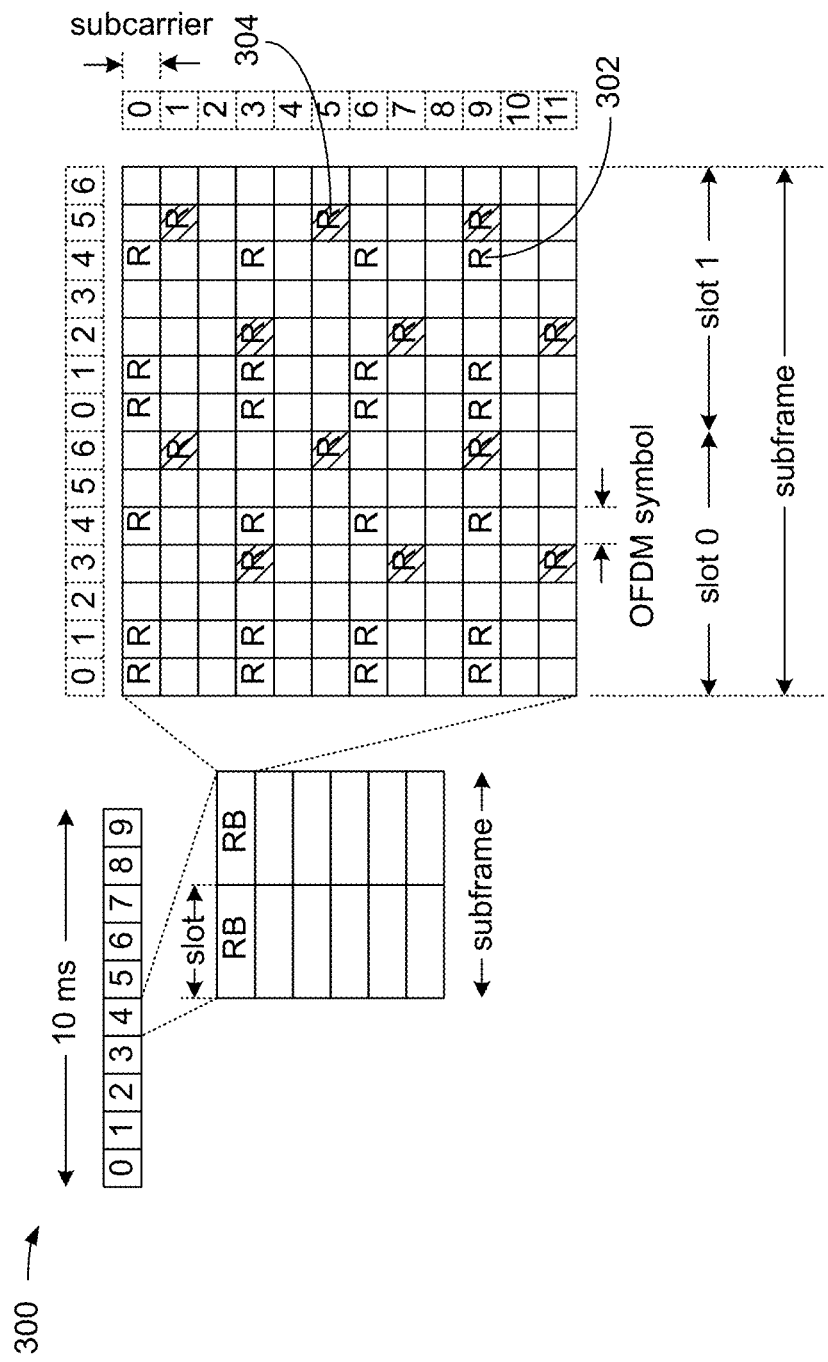
FIG. 3 is a diagram illustrating an example of a DL frame structure in LTE, in accordance with various aspects of the present disclosure.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, for a normal cyclic prefix, a resource block contains 12 consecutive subcarriers in the frequency domain and 7 consecutive OFDM symbols in the time domain, for a total of 84 resource elements. For an extended cyclic prefix, a resource block contains 12 consecutive subcarriers in the frequency domain and 6 consecutive OFDM symbols in the time domain, for a total of 72 resource elements. In other exemplary communication systems, such as, for example, a 5G or a NR communication system, other numbers of subcarriers in the frequency domain and symbols in the time domain, providing other numbers of resource elements are possible. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
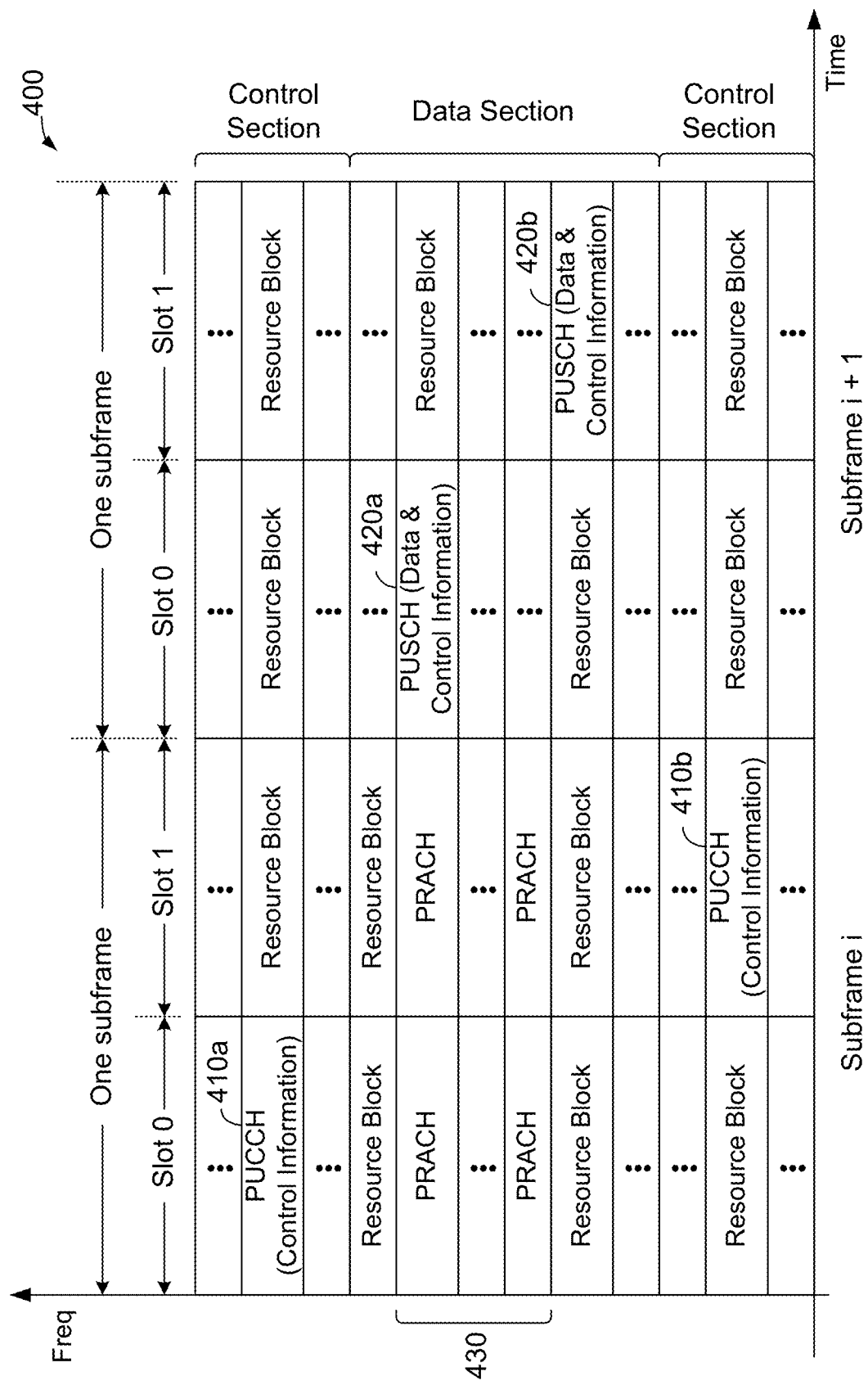
FIG. 4 is a diagram illustrating an example of an UL frame structure in LTE, in accordance with various aspects of the present disclosure.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410*a*, 410*b* in the control section to transmit control information to an eNB/gNB. The UE may also be assigned resource blocks 420*a*, 420*b* in the data section to transmit data to the eNB/gNB. The UE may transmit control information in a physical UL control channel (PUCCH) on the assigned resource blocks in the control section. The UE may transmit data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make a single PRACH attempt per frame (10 ms).

Figure 5:
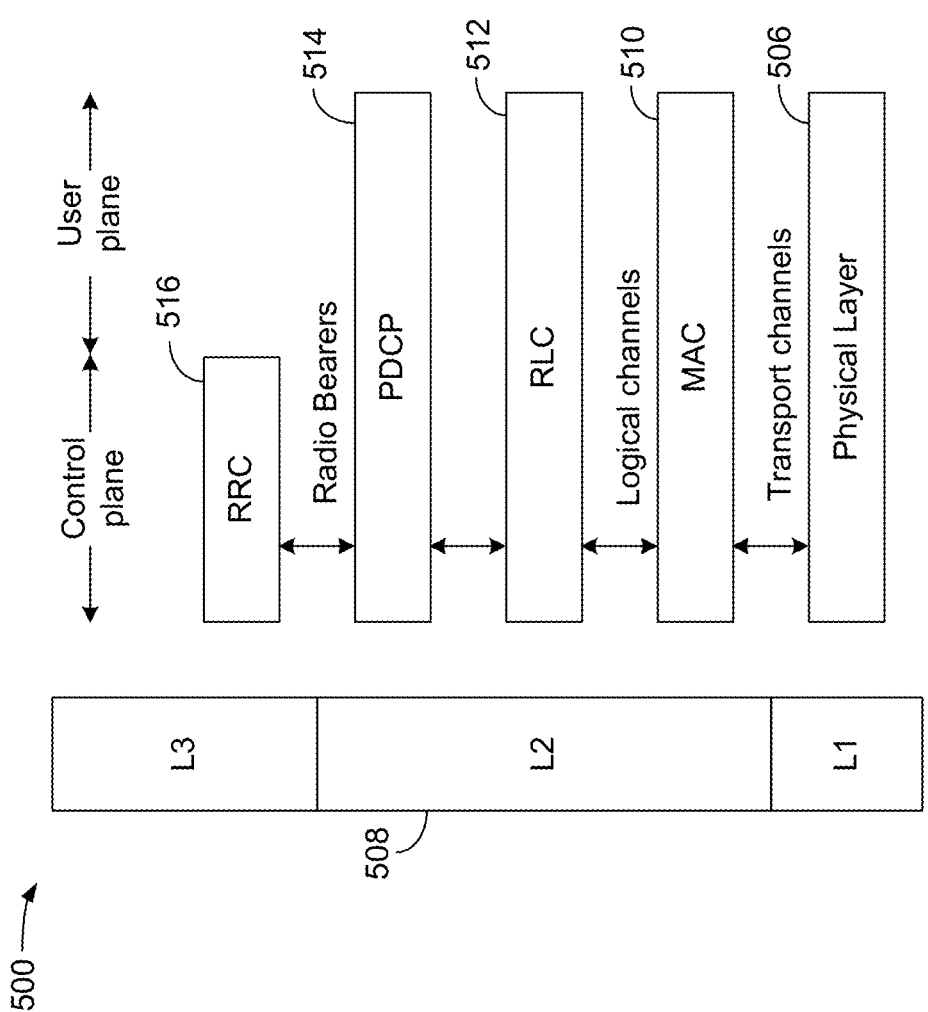
FIG. 5 is a diagram illustrating an example of a radio protocol architecture for the user and control planes in accordance with various aspects of the present disclosure.

FIG. 5 is a diagram 500 illustrating an example of a radio protocol architecture for the user and control planes in LTE in accordance with various aspects of the present disclosure. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
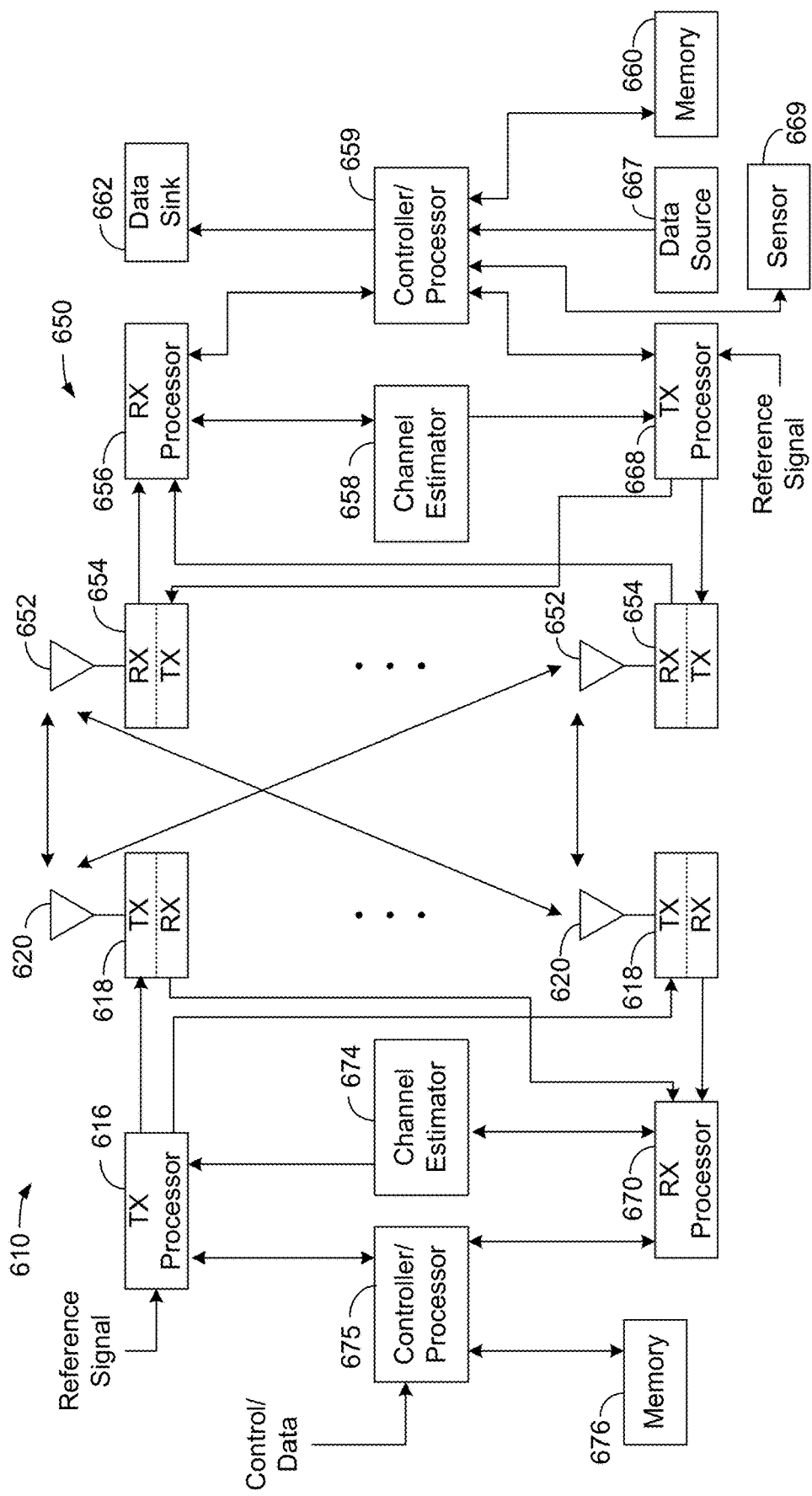
FIG. 6 is a diagram illustrating an example of an evolved Node B and user equipment in an access network in accordance with various aspects of the present disclosure.

FIG. 6 is a block diagram of an eNB/gNB 610 in communication with a UE 650 in an access network in accordance with various aspects of the present disclosure. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

The UE 650 may also comprise one or more internal sensors, collectively shown as sensor element 669 coupled to the controller/processor 659. The sensor element 669 may comprise one or more sensors, such as a motion sensor, a location sensor, etc., configured to allow the UE 650 to determine, for example, its location, its orientation, the location of a hand or other part of human anatomy in relation to the UE 650, and in particular, the relation of anatomy to the antenna arrays on the UE 650, etc. In an exemplary embodiment, the methods described herein may be performed by the controller/processor 675 and the memory 676 in the eNB 610 and/or by the controller/processor 659 and the memory 660 in the UE 650.

Figure 7:
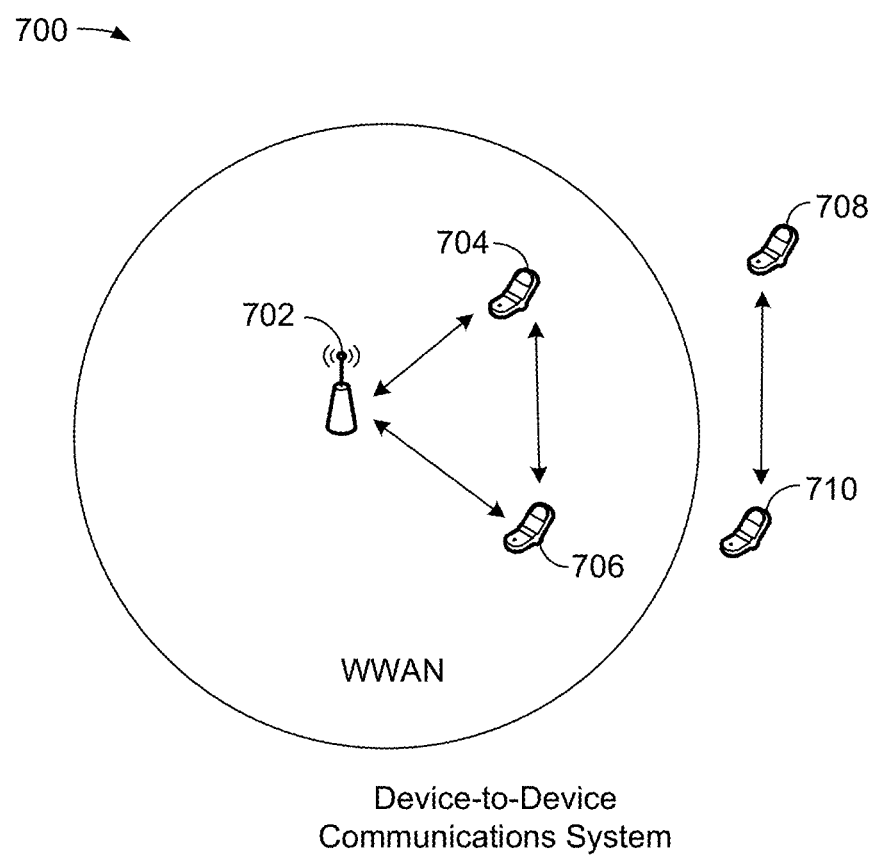
FIG. 7 is a diagram of a device-to-device communications system in accordance with various aspects of the present disclosure.

FIG. 7 is a diagram of a device-to-device (D2D) communications system 700 in accordance with various aspects of the present disclosure. The device-to-device communications system 700 may be implemented by the network shown in FIG. 1, and, in an exemplary embodiment, includes a plurality of wireless devices 704, 706, 708, 710. The device-to-device communications system 700 may overlap with a cellular communications system, such as for example, a wireless wide area network (WWAN). Some of the wireless devices 704, 706, 708, 710 may communicate together in device-to-device (or peer-to-peer) communication using the DL/UL WWAN spectrum, some may communicate with the base station 702, and some may do both. For example, as shown in FIG. 7, the wireless devices 708, 710 are in device-to-device communication and the wireless devices 704, 706 are in device-to-device communication. The wireless devices 704, 706 are also communicating with the base station 702.

In one configuration, some or all of the UEs 704, 706, 708, 710 may be equipped or located on vehicles. In such a configuration, the D2D communications system 700 may also be referred to as a vehicle-to-vehicle (V2V) communications system.

The exemplary methods and apparatuses discussed infra are applicable to any of a variety of wireless device-to-device communications systems, such as for example, a wireless device-to-device communication system based on FlashLinQ, WiMedia, Bluetooth, ZigBee, or Wi-Fi based on the IEEE 802.11 standard. To simplify the discussion, the exemplary methods and apparatus are discussed within the context of LTE. However, one of ordinary skill in the art would understand that the exemplary methods and apparatuses are applicable more generally to a variety of other wireless device-to-device communication systems.

Figure 8:
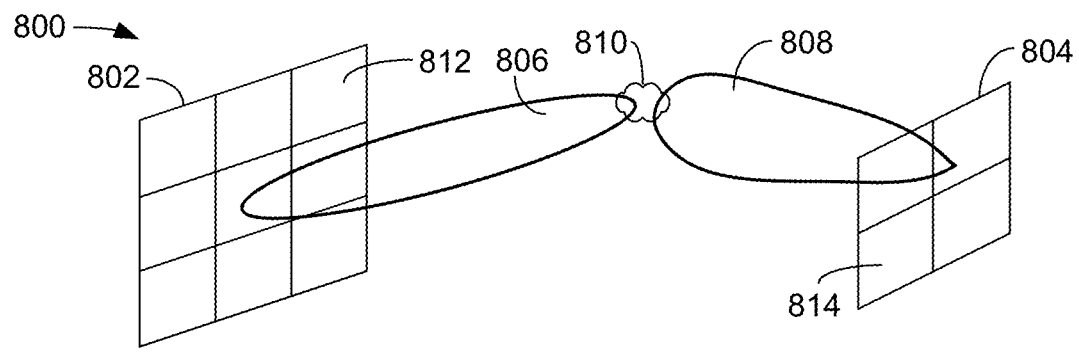
FIG. 8 is a diagram illustrating an example of beamforming in a low-frequency wireless communication system (e.g., LTE).

FIG. 8 is a diagram 800 illustrating an example of beamforming in a low-frequency wireless communication system (e.g., LTE). FIG. 8 includes antenna arrays 802 and 804. In an exemplary embodiment, the antenna array 802 may include a number of antenna elements (e.g., antenna element 812) arranged in a grid pattern (e.g., a planar array) and may be located in a base station. In an exemplary embodiment, the antenna array 804 may include a number of antenna elements (e.g., antenna element 814) arranged in a grid pattern and may be located in a UE. As shown in FIG. 8, the antenna array 802 may transmit beam 806 and the antenna array 804 may receive via beam 808. In an exemplary embodiment, the beams 806 and 808 may reflect, scatter, and/or diffract via the cluster located at area 810.

Figure 9:
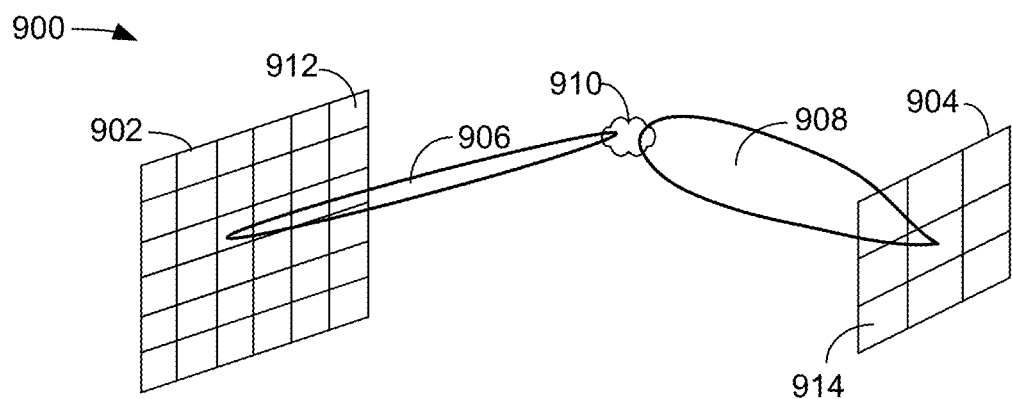
FIG. 9 is a diagram illustrating beamforming in a high-frequency wireless communication system (e.g., an mmW system).

FIG. 9 is a diagram 900 illustrating beamforming in a high-frequency wireless communication system (e.g., an mmW system). FIG. 9 includes antenna arrays 902 and 904. In an exemplary embodiment, the antenna array 902 may include a number of antenna elements (e.g., antenna element 912) arranged in a grid pattern and may be located in an mmW-base station. In an exemplary embodiment, the antenna array 904 may include a number of antenna elements (e.g., antenna element 914) arranged in a grid pattern and may be located in a UE. As shown in FIG. 9, the antenna array 902 may transmit beam 906 and the antenna array 904 may receive via beam 908. In an exemplary embodiment, the beams 906 and 908 may reflect, scatter, and/or diffract via the cluster located at area 910.

It should be noted that the antenna array 902 in FIG. 9 includes a greater number of antenna elements than the antenna array 802 in FIG. 8, and that the antenna array 904 in FIG. 9 includes a greater number of antenna elements than the antenna array 804 in FIG. 8. The greater number of antennas in the former scenario (relative to the latter) is because of the larger carrier frequency corresponding to smaller wavelengths that allows the deployment of a greater number of antennas within the same aperture/area. The greater number of antenna elements in antenna arrays 902 and 904 allow the beams 906 and 908 to have a narrow half-power beam width offering a high angular resolution relative to the beams 806 and 808 from antenna arrays 802 and 804. Therefore, the lower number of antenna elements in antenna arrays 802 and 804 in the low-frequency wireless communication system may result in a wider angular resolution, while providing a better link margin than in the mmW system.

In a stand-alone mmW wireless communication system, the high link losses (due to penetration, diffraction, reflection, etc.) may prevent discovery of the angular information of multipath. In contrast, a low-frequency wireless communication system may provide a link having a higher quality (e.g., a link having higher SNR) than a link in a stand-alone mmW wireless communication system. This higher SNR of the low-frequency wireless communication system and the coexistence of the low-frequency and the stand-alone mmW wireless communication systems may be leveraged to determine the angular information and/or relative path gains for the beamforming scheme. Since the angular information and/or relative path gains for the beamforming scheme is only determined by the relative geometries of the transmitter, the receiver, and the scatterers, such angular information and/or relative path gains are generally invariant in both stand-alone mmW and low-frequency wireless communication systems. While there are scenarios where the ranking (of dominance) of paths could change with changing carrier frequency (e.g., due to differential scattering and/or absorption losses at different frequencies), such ranking may not change in a majority of cases.

In an exemplary embodiment, methods for learning angles of arrival and departure of beams successful at high SNR may be used to learn the angles of arrival and departure of beams in a low-frequency wireless communication system. Such methods may include MUltiple SIgnal Classification (MUSIC), Estimation of Signal Parameters via Rotation Invariant Techniques (ESPRIT), Space-Alternating Generalized Expectation-maximization (SAGE) algorithm, etc. In some scenarios, the wide beam widths of the low-frequency transmissions in low-frequency wireless communication systems may result in poor angular precision. In an exemplary embodiment, the angles learned for the low-frequency wireless communication system may serve as a coarse estimate for the angles (also referred to as angular information) needed for beamforming in the mmW wireless communication system. A refined estimate of the angular information for the mmW wireless communication system may be determined using the coarse angle estimate obtained via the low-frequency wireless communication system as the initial value (also referred to as the seed value). For example, the refined estimate may be determined using algorithms, such as fine-beam tuning or constrained MUSIC.

In an exemplary embodiment, the asymmetric capabilities between an mmW wireless communication system and low-frequency wireless communication system may be leveraged to reduce complexity in the algorithms used to implement the mmW wireless communication system and low-frequency wireless communication system. For example, low-frequency wireless communication systems may use a fewer number of antennas than mmW wireless communication systems. Such asymmetry in number of antennas may be leveraged to estimate the probable signal directions in algorithms, such as MUSIC, ESPRIT and/or SAGE. It should be noted that estimating the probable signal directions with any such algorithm (e.g., MUSIC, ESPRIT, and/or SAGE) is based on obtaining an accurate estimate of the signal covariance matrix. For example, an accurate estimate of the signal covariance matrix may be achieved using a smaller number of training samples (or shorter covariance matrix acquisition and angle learning periods) and with lower computational cost (smaller number of multiplications and additions, and matrix inversion of smaller dimension) for smaller antenna systems than for larger dimensional systems.

In an exemplary embodiment, the asymmetric capabilities between the transmitter and the receiver may be leveraged to proportionally allocate more resources for angle determination in the low-frequency wireless communication system than the mmW wireless communication system. For example, the asymmetric capabilities may include a different number of antennas at the transmitter and the receiver, different beamforming capabilities (e.g., digital beamforming capability or RF beamforming capability) between the transmitter and the receiver, and/or lower power at the receiver.

In an exemplary embodiment, the cell frame and OFDM symbol timing information obtained from the low-frequency wireless communication system may be used as an initial value for further refinement with the mmW wireless communication system. In such exemplary embodiment, since the low-frequency wireless communication system generally provides a better SNR than the mmW wireless communication system, these quantities may be estimated more reliably at lower frequencies (e.g., below 6.0 GHz) than at higher frequencies (e.g., frequencies between 10.0 GHZ to 300.0 GHz). In exemplary embodiment, the cell frame and/or OFDM symbol timing information may be determined using synchronization signals (e.g., primary synchronization signals (PSSs) and secondary synchronization signals (SSSs)) that enable a UE to synchronize with the cell and detect quantities of interest, such as cell frame timing, carrier frequency offset, OFDM symbol timing, and/or cell identification (ID).

In an exemplary embodiment, the carrier frequency offset may be estimated for the mmW wireless communication system after fine-tuning around the estimate provided by the low-frequency wireless communication system. For example, the fine-tuning may be performed with a smaller number of frequency hypotheses. Therefore, low-frequency assistance may significantly enhance the performance of the mmW protocols with respect to latency, lower SNR requirements for the same performance, and/or lower computational cost.

Figure 10:
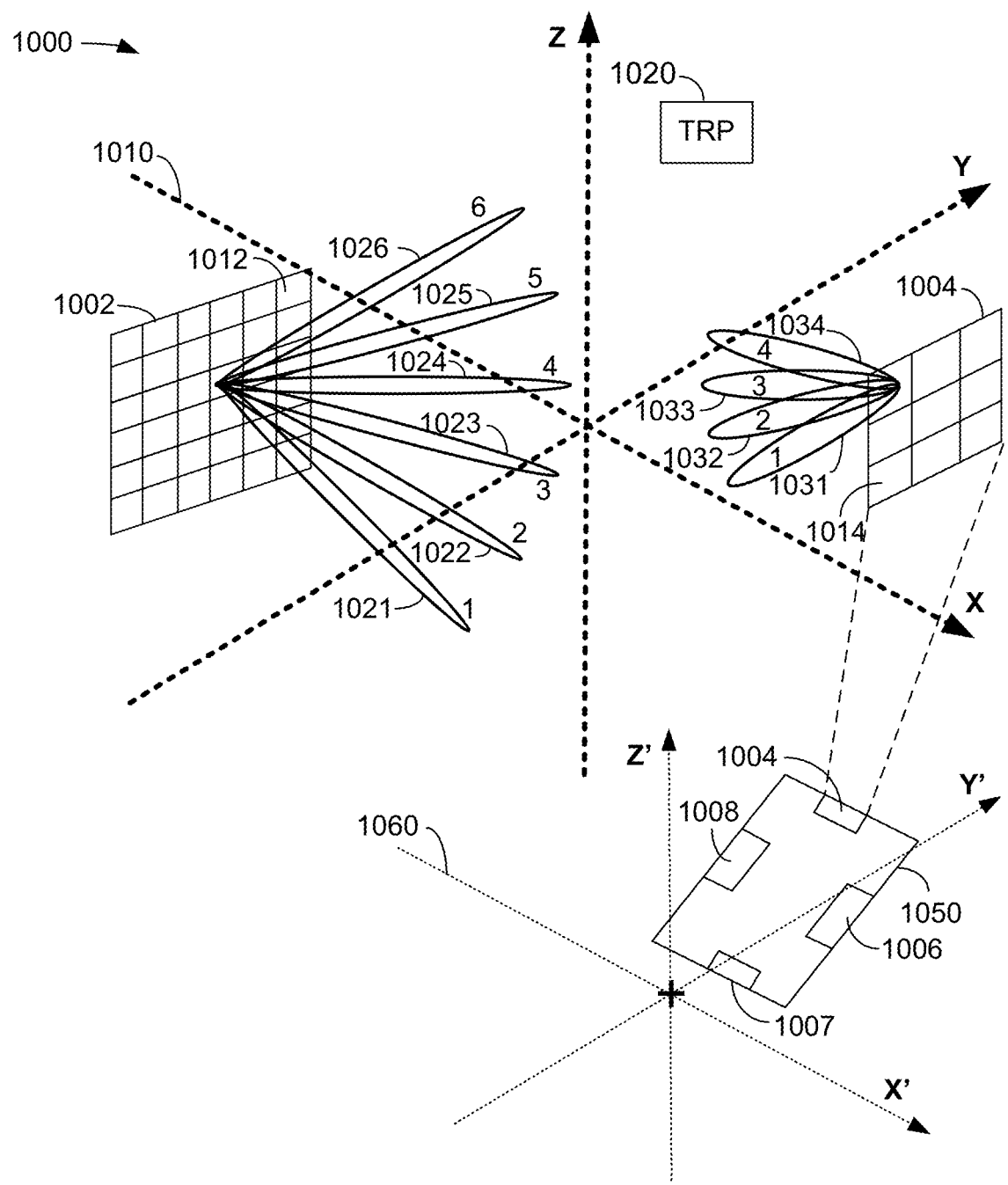
FIG. 10 is a diagram illustrating a communication system in accordance with various aspects of the present disclosure.

FIG. 10 is a diagram illustrating a communication system in accordance with various aspects of the present disclosure. A communication system 1000 may comprise a base station (not shown) having a base station antenna array 1002 and a UE 1050 having a UE antenna array 1004. The antenna array 1002 may include a number of antenna elements (e.g., antenna element 1014) arranged in a grid pattern and may be located in a base station and the antenna array 1004 may include a number of antenna elements (e.g., antenna element 1014) arranged in a grid pattern and may be located in a UE 1050.

A transmission reception point (TRP) 1020 may be located in the vicinity of the antenna array 1002 and the antenna array 1004. The TRP may be any device that may be affected by energy radiated, or otherwise emitted from the antenna array 1002 and/or the antenna array 1004.

The antenna array 1002 and the antenna array 1004 are shown in relation to a global coordinate system (GCS) 1010.

The GCS 1010 is shown as a Cartesian coordinate system having orthogonal X, Y and Z axes, but may be any coordinate system, such as a polar coordinate system. The GCS may be used to define the location of the antenna array 1002 and the antenna array 1004, and communication beams related to the antenna array 1002 and the antenna array 1004.

In an exemplary embodiment, the antenna array 1002 is shown as generating six (6) communication beams 1021, 1022, 1023, 1024, 1025 and 1026, also labeled 1 through 6 in FIG. 10. In an exemplary embodiment, the antenna array 1004 is shown as generating four (4) communication beams 1031, 1032, 1033, and 1034, also labeled 1 through 4 in FIG. 10. It is understood that the antenna array 1002 and the antenna array 1004 are capable of generating many more communication beams than the communication beams shown in FIG. 10. Further, the communication beams generated by the antenna array 1002 and the antenna array 1004 are capable of generating transmission and reception communication beams.

In an exemplary embodiment, the UE 1050 is also shown in relation to a local coordinate system (LCS) 1060. In an exemplary embodiment, the UE 1050 may comprise a number of antenna arrays, sometimes referred to as antenna subarrays, with antenna arrays 1004, 1006, 1007 and 1008 being shown for exemplary purposes only. The LCS 1060 is shown as a Cartesian coordinate system having orthogonal X', Y' and Z' axes, but may be any coordinate system, such as a polar coordinate system. In an exemplary embodiment, the location of the UE 1050, and the direction of the communication beams 1031, 1032, 1033 and 1034 in the LCS may be mapped to corresponding coordinates in the GCS 1010, and the location of the UE 1050, and the direction of the communication beams 1031, 1032, 1033 and 1034 in the GCS may be mapped to corresponding coordinates in the LCS 1060.

In an exemplary embodiment, beamforming leads to higher spectral efficiency in mmW, or 5G or NR systems. UE-specific and base station-specific (5G-NR non-specified) analog codebooks may be used for beamforming at the UE and the base station, respectively. Such codebook designs are typically proprietary both at the base station and the UE. Typical codebook/beam design constraints include, for example, antenna array gain vs. coverage tradeoffs.

For example, a pseudo-omni beam may provide broader coverage/higher robustness vs. directional/directional refinement beams that may provide higher array gain in specific directions. Practical beam design should also include additional constraints such as areas or directions where the radiation of antenna array energy should be minimized, also referred to as beam nulling. As used herein, the terms "nulling", "beam nulling" "beam nulling constraint" and "beam nulling region" may refer to any of a direction, region or area toward or within which it is desirable to minimize an amount of power or energy projected or radiated by an antenna or an antenna array. For example, there may be directions in which it is desirable to minimize the amount of energy projected or radiated by an antenna array to minimize interference with other devices, such as the TRP 1020. For example, the beam 1026 from the antenna array 1002 is projected toward the TRP 1020. Similarly, the beam 1034 from the antenna array 1004 is also projected toward the TRP 1020. In an exemplary embodiment, it may be desirable to minimize the amount of energy projected or radiated toward a device or object, such as the TRP 1020. In another exemplary embodiment, it may be desirable to avoid projecting or radiating energy from a particular antenna array associated with a UE or with a base station. For example, it may be desirable to prevent energy from being emitted from one or more of the antenna arrays 1004, 1006, 1007 and/or 1008 associated with the UE 1050 at one or more particular times, or if the UE is in one or more particular orientations. For example if the UE 1050 is in a user's hand and the user's hand is covering the antenna array 1008 for example, it may be desirable to minimize the amount of energy projected toward, or received through the user's hand.

Figure 11:
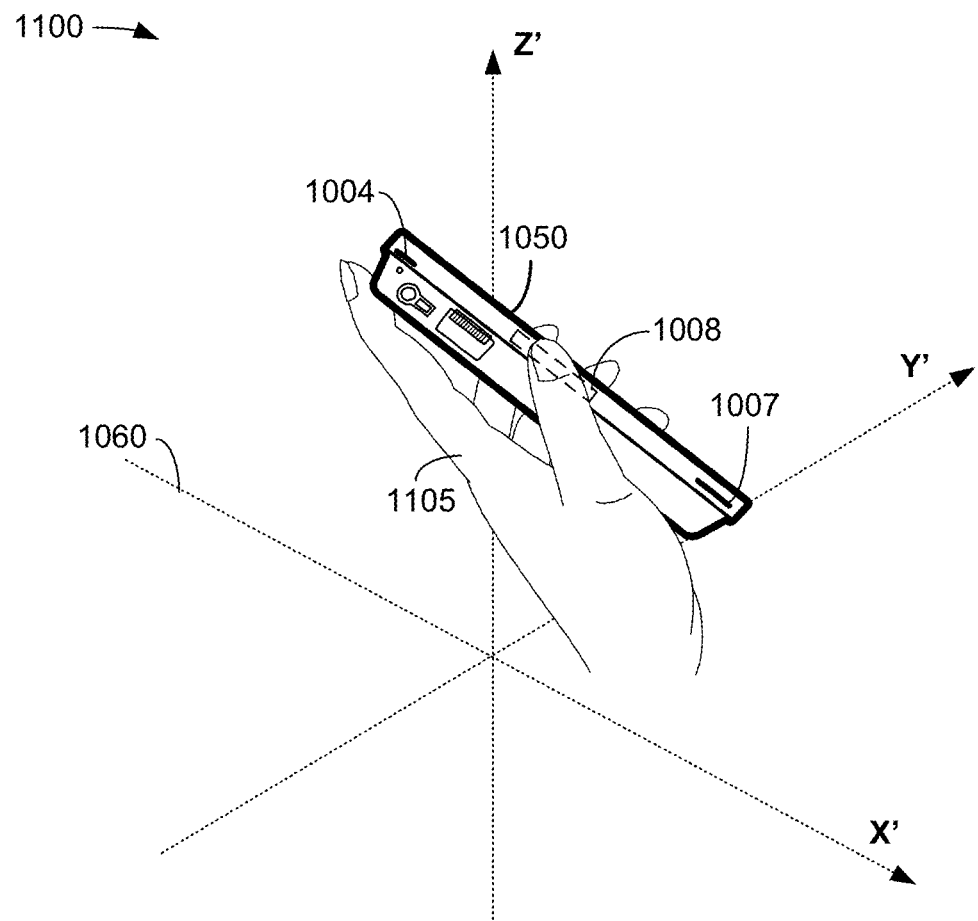
FIG. 11 is a diagram of a UE in a local coordinate system (LCS) in accordance with various aspects of the present disclosure.

FIG. 11 is a diagram 1100 of a UE 1050 in a local coordinate system (LCS) 1060 in accordance with various aspects of the present disclosure. In an exemplary embodiment, the UE 1050 may be located in the LCS 1060. The UE may comprise one or more antenna arrays, with antenna arrays 1004, 1007 and 1008 shown in FIG. 11 for convenience of illustration. In an exemplary embodiment, a portion 1105 of a user's anatomy (in this example, a user's hand) may be holding the UE 1050 in a manner such that one or more antenna arrays may be in very close proximity to the portion 1105 of the user's anatomy. In this example, at least a part of the user's hand may be covering or obscuring the antenna array 1008.

In such an example, it may be desirable to limit or control the amount of power or energy projected by the antenna array 1008, or otherwise allowed to emanate or radiate from the UE 1050, to remain below or stay within a certain threshold, particularly in the direction toward the portion 1105 of the user's anatomy, so as to comply with MPE constraints. In accordance with an exemplary embodiment, one or more sensors of the sensor element 669 (FIG. 6) may generate sensor information for the UE 1050, enabling the UE 1050 to control the amount of power or energy and the direction of a communication beam emitted by, or configured to receive energy at, each antenna array, where the amount of power and the direction of the communication beam are determined, at least in part, by the one or more sensors in the sensor element 669 (FIG. 6). In this example, the sensor element 669 in the UE may sense that a portion 1105 of a user's anatomy may be in close proximity to the antenna array 1008, such that this information may allow the UE 1050 to be configured to limit one or more of the direction and power of a communication beam emitted by the antenna array 1008 toward the portion 1105, to avoid exceeding an MPE constraint. In an exemplary embodiment, other sensor inputs from the sensor element 669, such as, for example, one or more of motion, temperature, location, etc., may be used as sensor inputs for the UE 1050 when generating a communication beam.

In an exemplary embodiment, it may be desirable to limit an amount and/or direction of power radiated from a UE 1050 based on one or more of the location of the TRP 1020 (FIG. 1) that may be affected by energy emitted from the UE 1050 and/or limit an amount and/or direction of power radiated from a UE 1050 based on an amount or level of power allowed to radiate from the UE 1050 according to, for example, an MPE limit or constraint.

In an exemplary embodiment, it may be desirable to limit an amount or level of power radiated from a UE 1050 based on the location of the TRP 1020 (FIG. 1) that may be affected by energy emitted from the UE 1050.

In an exemplary embodiment, it may be desirable to limit an amount of power radiated from a UE 1050 based on an amount of power allowed to radiate from the UE 1050 according to, for example, an MPE limit or constraint.

In an exemplary embodiment, it may be desirable to limit the direction of power radiated from a UE 1050 based on the location of the TRP 1020 (FIG. 1) that may be affected by energy emitted from the UE 1050.

In an exemplary embodiment, it may be desirable to limit the direction of power radiated from a UE 1050 based on an amount of power allowed to radiate from the UE 1050 according to, for example, an MPE limit or constraint.

In an exemplary embodiment, the TRP avoidance methodology may be determined by the base station and communicated to the UE. The amount of power and the direction of the communication beam may also be determined, at least in part, by the one or more sensors in the sensor element 669 (FIG. 6) in the UE and may be combined with the information provided by the base station to develop communication beams from the base station and the UE that may avoid both a TRP and a portion 1105 of a user's anatomy.

In an exemplary embodiment, the TRP avoidance methodology may be determined by one or more of the base station and the UE individually.

In an exemplary embodiment, it may be desirable to minimize the amount of side lobe energy projected by a particular antenna array or a particular communication beam. In such an embodiment where side lobe suppression is desired, it may be desired to design the communication beams in such a way that a communication beam cannot transmit beyond a certain power level in certain direction(s) to minimize interference in that/those direction(s). For example, it may be desirable to minimize interference to or with another cell UE/gNB/TRP that may be transmitting in the same frequency band and/or time. As another example, it may be desirable to prevent energy from one or more communication beams in a mmW communication system from being projected in a particular direction, or above a particular power level. In another example, it may be desirable to have control over energy emitted in particular directions in satellite communication systems that are transmitting in "shared" spectrum to rural/semi-urban communities with poor WiFi access and "expecting" coordinated transmission from UEs. In another exemplary embodiment, there may be mission critical services that do not anticipate directional interference (typical of mmW systems) in specific direction(s).

In another exemplary embodiment, maximum permissible exposure (MPE) constraints may be such that a communication beam cannot transmit beyond a certain power level in a certain direction or directions. In such an exemplary embodiment, it may be desirable to limit an amount and/or direction of power radiated from a UE 1050 based on an amount of power allowed to radiate from the UE 1050 according to, for example, an MPE limit.

In another exemplary embodiment, RF power consumption goals may determine the amount of power that may be transmitted in a particular direction. For example, a communication beam or communication beams from a UE in a mmW communication system may consume different amounts of RF and intermediate frequency (IF) power, depending on how many antennas are used to form the communication beams. Typically, the fewer the number of antenna elements used to form a communication beam, the lower the power consumption.

Signaling Systems and Methods

In an exemplary embodiment, a base station and/or a UE may discover one or more unintended signal directions and one or more power levels from other network operators, from one or more TRPs, from other devices or entities that share the communication spectrum, or from other sources, etc.

In an exemplary embodiment, a base station and/or a UE may translate the one or more unintended signal directions and the one or more power levels to a global coordinate system (GCS), and then transmit the one or more unintended signal directions and the one or more power levels to a UE.

For example, let a set of unintended signal directions be denoted as $\{\omega \in \Omega_{2,GCS}\}$. The unintended signal directions $\Omega$ could be noted in azimuth and/or in elevation, or in other coordinates or coordinate systems.

However, in an exemplary embodiment, the base station is likely unaware of the UE's precise current orientation, which may be defined by the UE's own local coordinate system (LCS) and how these GCS coordinates defining the unintended signal directions may map to the LCS.

In an exemplary embodiment, the unintended signal directions may be referred to in the LCS as $\{\omega \in \Omega_{2,LCS}\}$.

In an exemplary embodiment, three rotational parameters (rotation angles) $\alpha$, $\beta$, $\gamma$ may capture and define the transformation from a GCS to an LCS, or from an LCS to a GCS. The UE may then use the unintended beam direction information and maximum power information to limit or prevent the emission of energy in that direction, or the reception of a receive beam, and within that power level.

Figure 12:
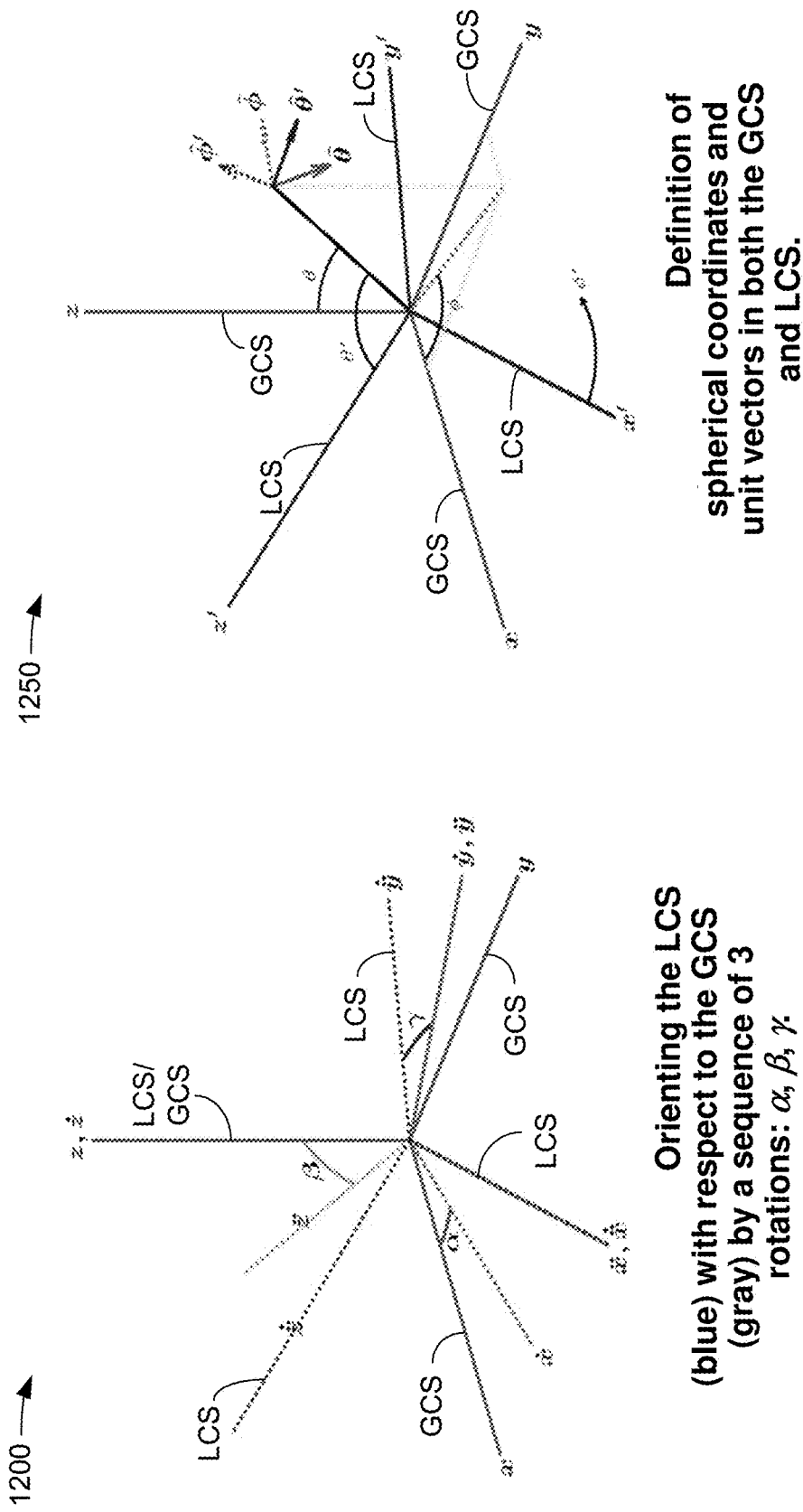
FIGS. 12A and 12B collectively illustrate examples of coordinate system mapping.

FIGS. 12A and 12B collectively illustrate two examples of coordinate system mapping. FIG. 12A is a diagram 1200 shows an example of orienting a LCS with respect to a GCS using a sequence of the three rotation angles $\alpha$, $\beta$, $\gamma$.

FIG. 12B is a diagram 1250 defining spherical coordinates and unit vectors in both the GCS and the LCS.

In an exemplary embodiment, a GCS with coordinates (x, y, z, $\theta$, $\phi$) and unit vectors ($\hat{\theta}$, $\hat{\phi}$) and an LCS with "primed" coordinates (x', y', z', $\theta'$, $\phi'$) and "primed" unit vectors ($\hat{\theta}'$, $\hat{\phi}'$) are defined with common origins in FIG. 12A and FIG. 12B.

Note that the vector fields of the array antenna elements are defined in the LCS. In FIG. 12A an arbitrary 3D-rotation of the LCS with respect to the GCS is given by the angles $\alpha$, $\beta$, $\gamma$. The set of angles $\alpha$, $\beta$, $\gamma$ can also be termed as the orientation of the array antenna with respect to the GCS. In an exemplary embodiment, the transformation of a location in a LCS to a location in a GCS can be determined by the angles $\alpha$, $\beta$, $\gamma$. The angle $\alpha$ is referred to as the bearing angle, $\beta$ is referred to as the downtilt angle and $\gamma$ is referred to as the slant angle. The three rotations described herein may be used to convert a location in a first coordinate system to a corresponding location in another coordinate system and the presented LCS to GCS coordinate transformation is one example of such coordinate transformation known to those having ordinary skill in the art. Such a transformation is understood in cellular systems design and is understood by those having ordinary skill in the art, and may be understood from wireless communication standardization efforts such as those presented in 3GPP TR36.873 or 3GPP TR 38.901. FIG. 12B shows the coordinate direction and unit vectors of the LCS and the GCS. Note that the vector fields of the array antenna elements are defined in the LCS. In particular, at the UE, antenna responses are often known in the LCS and these can then be translated and/or transformed to the GCS via the transformations presented in FIGS. 12A and 12B.

In an exemplary embodiment, a communication device, such as a base station and/or a UE may determine the appropriate number of antennas to use for beamforming based on RF/IF power constraint. Let this number be N. Without loss in generality, assume an N-dimensional uniform linear antenna array (ULA) at the UE and let an array steering vector $\theta$ in a direction be $a(\theta)$.

An exemplary desired/intended beam direction(s) $= \{\theta \in \Theta_1\}$.

An exemplary unintended beam direction(s)$= \{\theta \in \Theta_2\}$.

In an exemplary embodiment, it is desirable to design $f_{UE}$ (an N×1) vector satisfying:

$$f_{UE} = \underset{f}{\arg\max}\ \underset{\theta \in \Theta_1}{\min}\ |a(\theta)^H f|^2$$

$$\text{subject to } \underset{\theta \in \Theta_2}{\max}|a(\theta)^H f|^2 \leq P_{intf} \text{ and } f^H f \leq 1$$

In other words, the above optimization maximizes the worst-case gain in the desired set of direction(s) $\Theta_1$ by constraining the best-case gain in the unintended set of direction(s) $\Theta_2$.

Additional constraints on the communication beam, f, such as the use of a B bit phase shifter may also be possible.

The above problem is non-convex and not simple to solve. There are no closed-form solutions for $f_{UE}$ unless both $\Theta_1$ and $\Theta_2$ are singleton sets each having one element.

An alternative optimization, which replaces the worst-case/best-case gains in the direction(s) of interest by the "accumulated" gain in those directions, may be stated as:

$$\hat{f}_{UE} = \underset{f}{\arg\max} \int_{\theta \in \Theta_1} |a(\theta)^H f|^2 d\theta$$

$$\text{subject to } \frac{\int_{\theta \in \Theta_2} |a(\theta)^H f|^2 d\theta}{P_{intf}} \leq 1 \text{ and } f^H f \leq 1$$

The above optimization may be rewritten as:

$$\hat{f}_{UE} = \underset{f}{\arg\max} f^H \left[\int_{\theta \in \Theta_1} a(\theta)a(\theta)^H d\theta\right] f$$

$$\text{subject to } f^H \left[\gamma \int_{\theta \in \Theta_2} a(\theta)a(\theta)^H d\theta + I\right] f \leq 1$$

for an appropriate choice of $\gamma$ depending on $P_{intf}$.

$\gamma$, which is a function of $P_{intf}$, captures the weight of the interference management constraint relative to the beam's energy normalization constraint. The term $\gamma$ used in this description of converting coordinates from GCS to LCS or LCS to GCS should not be confused with the sequence of the three rotation angles $\alpha$, $\beta$, $\gamma$ mentioned above. A closed-form solution to the above problem is a/the unit-norm dominant eigenvector of the following matrix:

$$\hat{f}_{UE} = Dom.\ eig.[(\gamma \cdot \int_{\theta \in \Theta_2} a(\theta)a(\theta)^H d\theta + I)^{-1} \cdot \int_{\theta \in \Theta_1} a(\theta)a(\theta)^H d\theta]$$

In an exemplary embodiment, a base station may inform a UE about beam directions in the GCS, $\{\omega \in \Omega_{2,GCS}\}$ and the UE translates it to beam directions in the LCS, $\{\omega \in \Omega_{2,LCS}\}$ using prior knowledge of $\alpha$, $\beta$, $\gamma$ learned from known signals, such as training signals exchanged between a base station and a UE.

In another exemplary embodiment, a base station may inform a UE about beam directions in the GCS, $\{\omega \in \Omega_{2,GCS}\}$ based on some beam indices in the UE side codebook used in, for example, a random access channel (RACH) transmission. In another alternative embodiment, a UE can incorporate additional directional constraints based on sensor data, such as from the sensor element 669 (FIG. 6) for MPE limitations.

Figure 13:
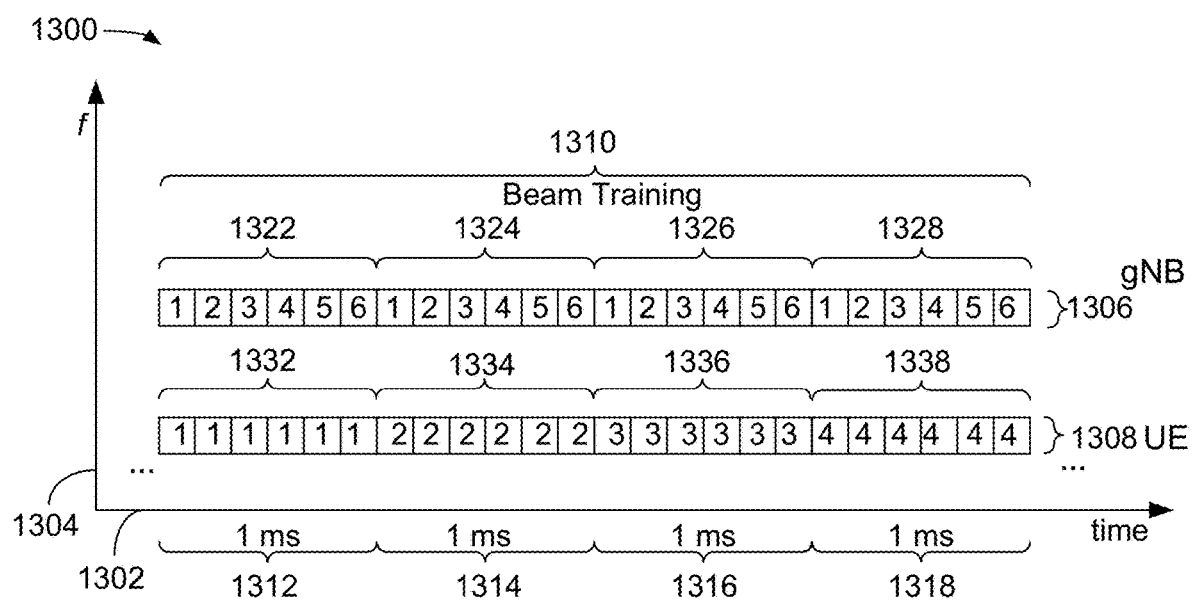
FIG. 13 is a diagram illustrating a data structure in accordance with various aspects of the present disclosure.

FIG. 13 is a diagram illustrating a data structure 1300 in accordance with various aspects of the present disclosure. In an exemplary embodiment, the data structure 1300 may comprise a number of radio resources that can be used for beam training. The data structure 1300 includes a horizontal axis 1302 showing time increasing to the right and a vertical axis 1304 showing frequency, f, increasing upwardly.

The data structure 1300 may comprise a beam training sequence 1310. The beam training sequence 1310 may include both the communications of a base station, shown using the reference numeral 1306, and the communications of a UE, shown using the reference numeral 1308. In an exemplary embodiment, the beam training sequence 1310 may occur over a number of communication subframes, with exemplary communication subframes 1312, 1314, 1316 and 1318 being shown in this example.

In an exemplary embodiment, the base station may communicate a subframe 1322 with information relating to the six communication beams shown in FIG. 10 (i.e., communication beams 1021, 1022, 1023, 1024, 1025 and 1026 (FIG. 10), shown as communication beams 1, 2, 3, 4, 5 and 6 in FIG. 13. During the subframe 1322, the UE maintains its beam index information fixed on beam 1031 (in FIG. 1), shown as beam 1 in FIG. 13, during the subframe 1332. In the subframe 1334, the UE has changed its beam index to beam 1032 (FIG. 10), shown in FIG. 13 as beam 2, while in subframe 1324, the base station again runs through its six beam indices 1, 2, 3, 4, 5 and 6. This proceeds with the UE changing its beam index to beam 1033 (FIG. 10), shown in FIG. 13 as beam 3 in subframe 1336, while in subframe 1326, the base station again runs through its six beam indices 1, 2, 3, 4, 5 and 6; and again proceeds with the UE changing its beam index to beam 1034 (FIG. 10), shown in FIG. 13 as beam 4 in subframe 1338, while in subframe 1328, the base station again runs through its six beam indices 1, 2, 3, 4, 5 and 6. In this example, the beam training sequence 1310 ends with subframes 1328 and 1338 because, in this example, the UE has four (4) communication beams. Other numbers of communication beams from the base station and the UE are contemplated.

In an exemplary embodiment, after the beam training sequence 1310, the base station knows to avoid its beam 1026 and the UEs beam 1034, because, in this example, those beams may interfere with the TRP 1020 (FIG. 10). In other words, the base station now knows that if it transmits using its communication beam 1026, it would interfere with the TRP 1020, and if the UE would transmit over communication beam 1034 (FIG. 10), the UE would interfere with the TRP 1020.

In an exemplary embodiment, the base station can determine the directions of the communication beams 1026 and 1034 with respect to the GCS 1010 (FIG. 10), using the angles α, β, γ, and then communicate this information to the UE, informing the UE of which beams it should avoid using. The UE may convert the communication beam directions from the GCS 1010 to directions and/or locations in the LCS 1060, so that the UE may avoid transmitting in the direction indicated by communication beam 1034, in this example.

Figure 14:
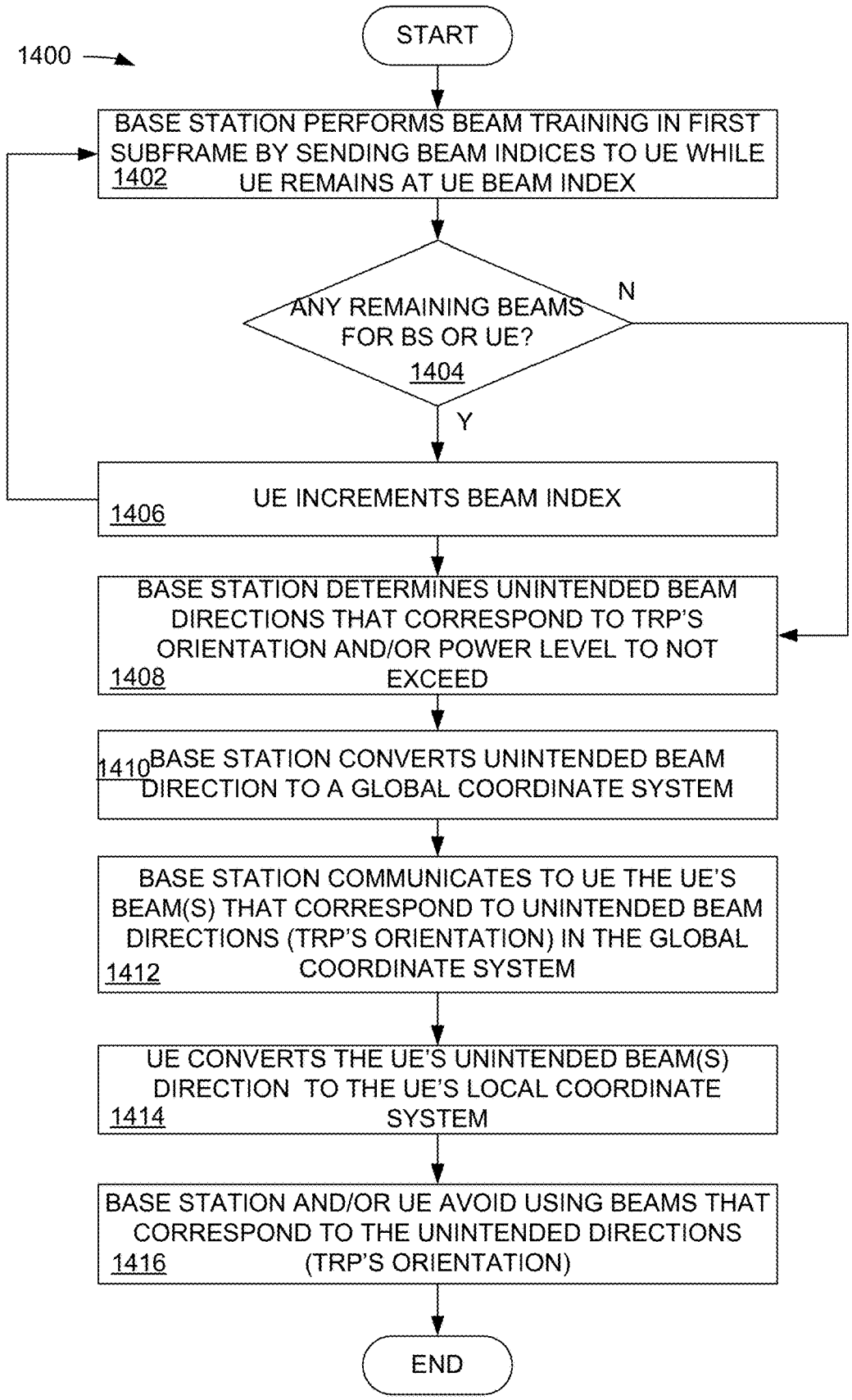
FIG. 14 is a flow chart illustrating an example of a method for communication, in accordance with various aspects of the present disclosure.

FIG. 14 is a flow chart illustrating an example of a method for communication, in accordance with various aspects of the present disclosure. The blocks in the method 1400 can be performed in or out of the order shown, and in some embodiments, can be performed at least in part in parallel.

In block 1402, a base station and a UE perform a beam training sequence, where the base station communicates beam index information to the UE in a first subframe, while the UE remains on a first UE beam index for that subframe.

In block 1404, it is determined whether there are any remaining beams for the base station or the UE. If, in block 1404 it is determined that there are remaining beams for the base station or the UE, then the process proceeds to block 1406, where the UE increments the beam index and the process then returns to block 1402. If, in block 1404 it is determined that there are no remaining beams for the base station or the UE, then the process proceeds to block 1408.

In block 1408, the base station determines unintended beam directions that correspond to a TRP's orientation and/or a power level not to be exceeded.

In block 1410, the base station converts the unintended beam direction to coordinates in a global coordinate system (GCS).

In block 1412, the base station transmits to a UE the UEs unintended beam directions that correspond to the TRPs orientation in the GCS.

In block 1414, the UE converts the unintended beam directions from the GCS to an LCS associated with the UE.

In block 1416, the base station and the UE avoid using beams that correspond to the unintended directions or at least limit the amount of energy radiated in the unintended directions.

Figure 15:
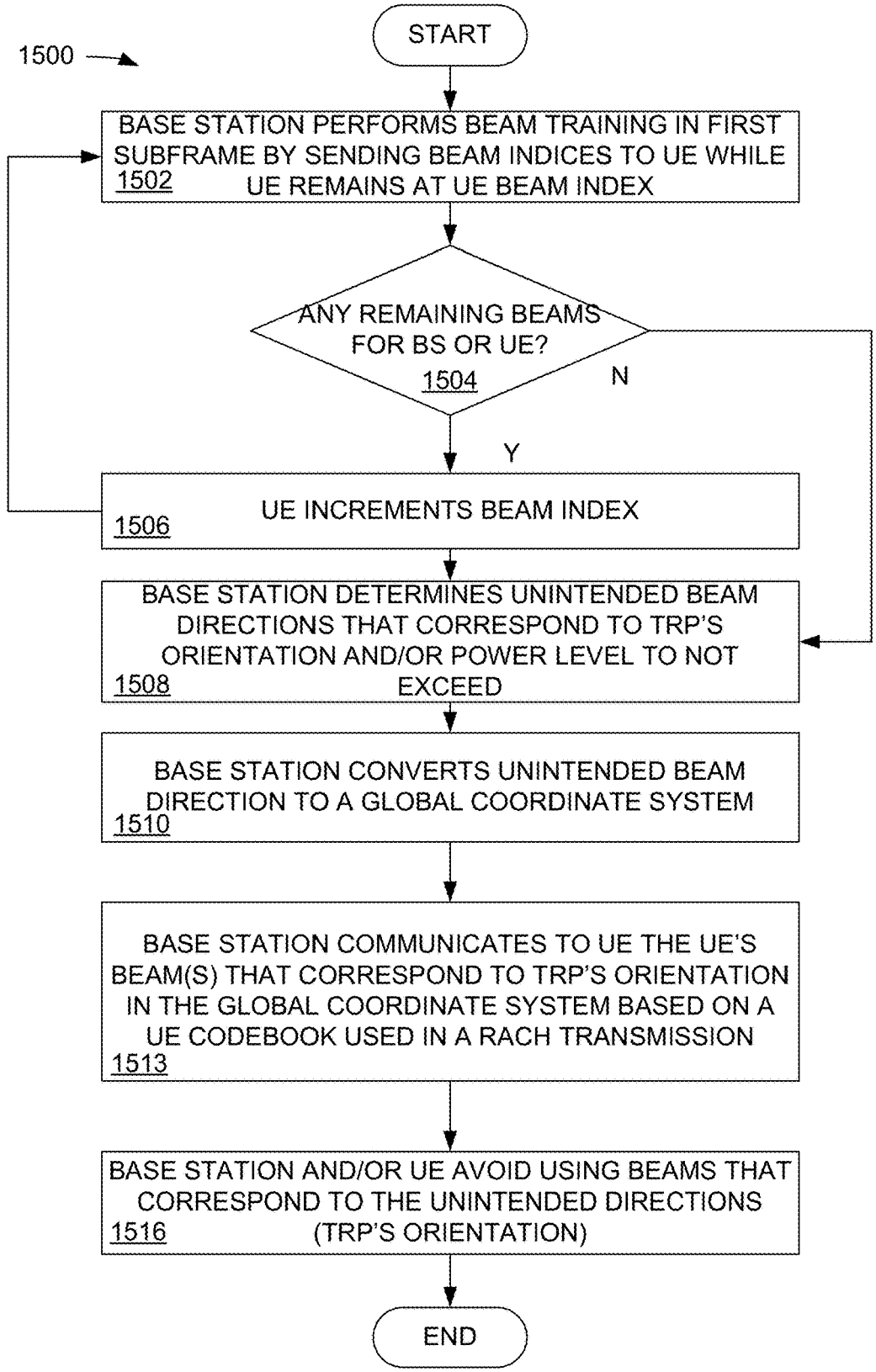
FIG. 15 is a flow chart illustrating an example of a method for communication, in accordance with various aspects of the present disclosure.

FIG. 15 is a flow chart illustrating an example of a method for communication, in accordance with various aspects of the present disclosure. The blocks in the method 1500 can be performed in or out of the order shown, and in some embodiments, can be performed at least in part in parallel.

In block 1502, a base station and a UE perform a beam training sequence, where the base station communicates beam index information to the UE in a first subframe, while the UE remains on a first UE beam index for that subframe.

In block 1504, it is determined whether there are any remaining beams for the base station or the UE. If, in block 1504 it is determined that there are remaining beams for the base station or the UE, then the process proceeds to block 1506, where the UE increments the beam index and the process then returns to block 1502. If, in block 1504 it is determined that there are no remaining beams for the base station or the UE, then the process proceeds to block 1508.

In block 1508, the base station determines unintended beam directions that correspond to a TRP's orientation and/or a power level not to be exceeded.

In block 1510, the base station converts the unintended beam direction to coordinates in a global coordinate system (GCS).

In block 1513, a base station communicates to the UE the UEs beams that correspond to an unintended direction, such as the orientation of a TRP, in a global coordinate system (GCS) based on a UE codebook used in a random access channel (RACH) transmission.

In block 1516, the base station and the UE avoid using beams that correspond to the unintended directions or at least limit the amount of energy radiated in the unintended directions.

Figure 16:
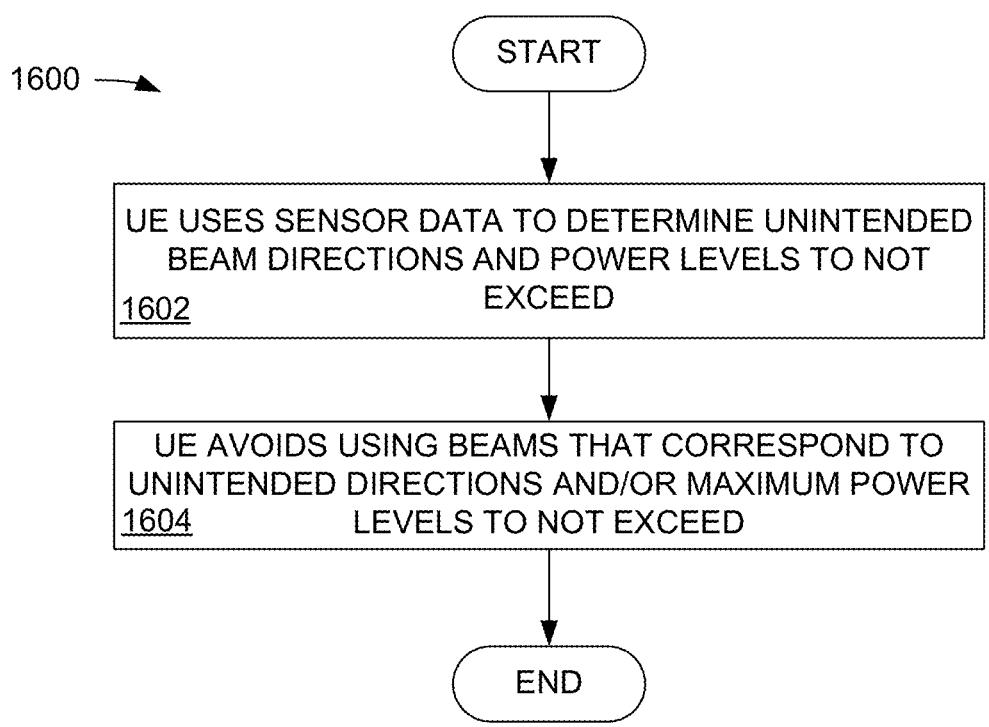
FIG. 16 is a flow chart illustrating an example of a method for communication, in accordance with various aspects of the present disclosure.

FIG. 16 is a flow chart illustrating an example of a method for communication, in accordance with various aspects of the present disclosure. The blocks in the method 1600 can be performed in or out of the order shown, and in some embodiments, can be performed at least in part in parallel.

In block 1602, a UE may use data obtained from one or more sensors to determine an unintended beam direction and a power level not to be exceeded.

In block 1604, a UE avoids using communication beams that correspond to the unintended beam direction and the power level not to be exceeded.

Figure 17:
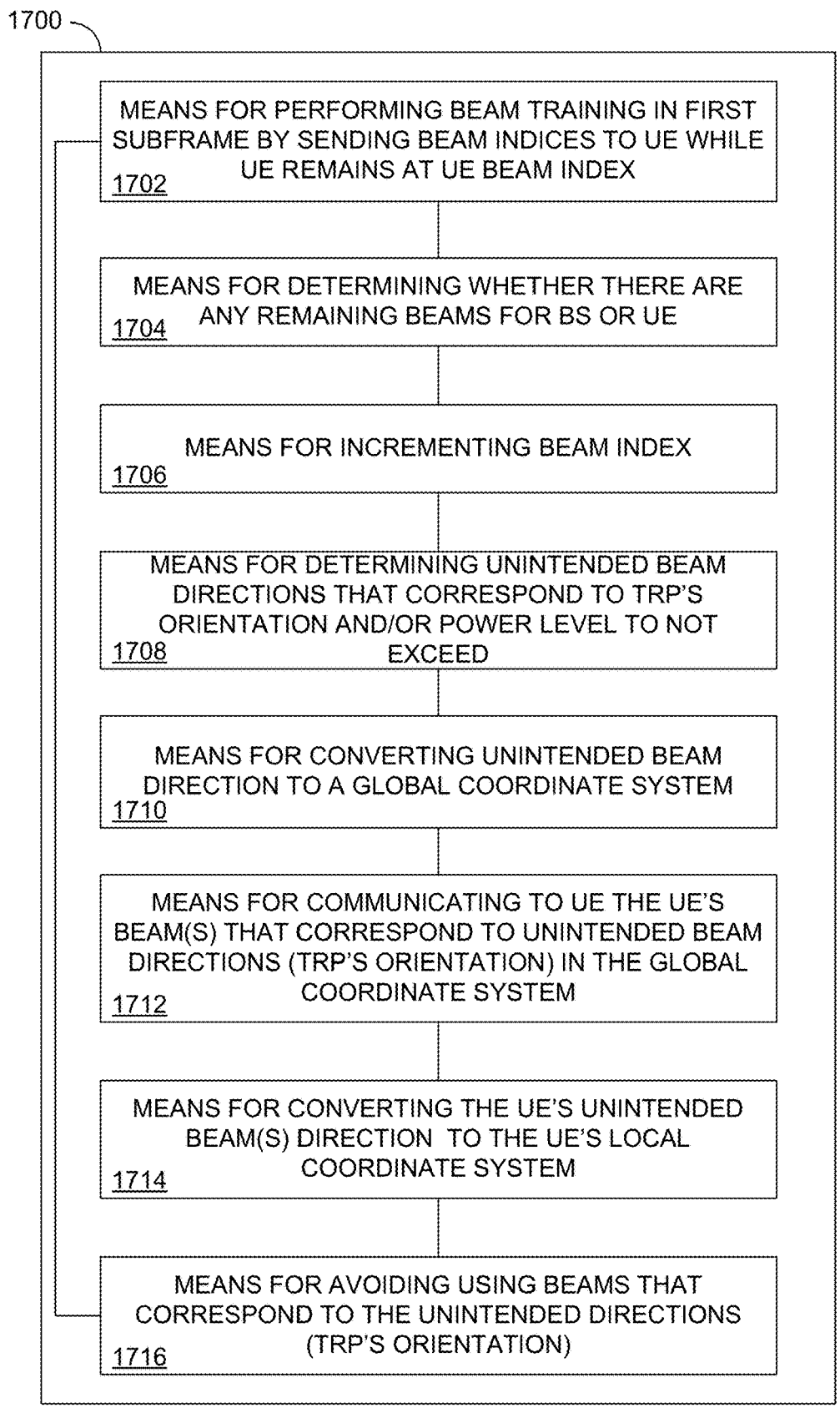
FIG. 17 is a functional block diagram of an apparatus for a communication system in accordance with various aspects of the present disclosure.

FIG. 17 is a functional block diagram of an apparatus 1700 for a communication system in accordance with various aspects of the present disclosure. The apparatus 1700 comprises means 1702 for performing a beam training sequence, where the base station communicates beam index information to the UE in a first subframe, while the UE remains on a first UE beam index for that subframe. In certain embodiments, the means 1702 for performing a beam training sequence, where the base station communicates beam index information to the UE in a first subframe, while the UE remains on a first UE beam index for that subframe can be configured to perform one or more of the function described in operation block 1402 of method 1400 (FIG. 14). In an exemplary embodiment, the means 1702 for performing a beam training sequence, where the base station communicates beam index information to the UE in a first subframe, while the UE remains on a first UE beam index for that subframe may comprise the base station 610 sending beam index information to a UE 650 using, for example, the controller/processor 675, memory 676, TX processor 616, transmitter 618, and related circuitry (FIG. 6).

The apparatus 1700 further comprises means 1704 for determining whether there are any remaining beams for the base station or the UE. In certain embodiments, the means 1704 for determining whether there are any remaining beams for the base station or the UE can be configured to perform one or more of the function described in operation block 1404 of method 1400 (FIG. 14). In an exemplary embodiment, the means 1704 for determining whether there are any remaining beams for the base station or the UE may comprise the base station 610 and/or the UE 650 determining if any additional beam index information is present using, for example, the controller/processor 675, memory 676, TX processor 616, transmitter 618, the controller/processor 659, memory 660, TX processor 668, transmitter 654, and related circuitry (FIG. 6).

The apparatus 1700 further comprises means 1706 for incrementing a beam index. In certain embodiments, the means 1706 for incrementing a beam index can be configured to perform one or more of the function described in operation block 1406 of method 1400 (FIG. 14). In an exemplary embodiment, the means 1706 for incrementing a beam index may comprise the UE 650 incrementing its beam index using, for example, the controller/processor 659, memory 660, TX processor 668, transmitter 654, and related circuitry (FIG. 6).

The apparatus 1700 further comprises means 1708 for determining unintended beam directions that correspond to a TRP's orientation and/or a power level not to be exceeded. In certain embodiments, the means 1708 for determining unintended beam directions that correspond to a TRP's orientation and/or a power level not to be exceeded can be configured to perform one or more of the function described in operation block 1408 of method 1400 (FIG. 14). In an exemplary embodiment, the means 1708 for determining unintended beam directions that correspond to a TRP's orientation and/or a power level not to be exceeded may comprise the base station 610 determining which of its and which of a UEs communication beams may interfere with a TRP, using, for example, the controller/processor 675, memory 676, TX processor 616, transmitter 618, and related circuitry (FIG. 6).

The apparatus 1700 further comprises means 1710 for converting the unintended beam direction to coordinates in a global coordinate system (GCS). In certain embodiments, the means 1710 for converting the unintended beam direction to coordinates in a global coordinate system (GCS) can be configured to perform one or more of the function described in operation block 1410 of method 1400 (FIG. 14). In an exemplary embodiment, the means 1710 for converting the unintended beam direction to coordinates in a global coordinate system (GCS) may comprise the base station 610 converting a UEs communication beams into coordinates related to a GCS, using, for example, the controller/processor 675, memory 676, TX processor 616, transmitter 618, and related circuitry (FIG. 6).

The apparatus 1700 further comprises means 1712 for transmitting to a UE the UEs unintended beam directions that correspond to the TRPs orientation in the GCS. In certain embodiments, the means 1712 for transmitting to a UE the UEs unintended beam directions that correspond to the TRPs orientation in the GCS can be configured to perform one or more of the function described in operation block 1412 of method 1400 (FIG. 14). In an exemplary embodiment, the means 1712 for transmitting to a UE the UEs unintended beam directions that correspond to the TRPs orientation in the GCS may comprise the base station 610 transmitting to a UE the UEs unintended beam directions that correspond to the TRPs orientation in the GCS, using, for example, the controller/processor 675, memory 676, TX processor 616, transmitter 618, and related circuitry (FIG. 6).

The apparatus 1700 further comprises means 1714 for converting the unintended beam directions from the GCS to an LCS associated with the UE. In certain embodiments, the means 1714 for converting the unintended beam directions from the GCS to an LCS associated with the UE can be configured to perform one or more of the function described in operation block 1414 of method 1400 (FIG. 14). In an exemplary embodiment, the means 1714 for converting the unintended beam directions from the GCS to an LCS associated with the UE may comprise the UE 610 converting the unintended beam direction coordinates received from the base station 610 to coordinates in the LCS associated with the UE 650 using, for example, the controller/processor 659, memory 660, TX processor 668, transmitter 654, and related circuitry (FIG. 6).

The apparatus 1700 further comprises means 1716 for avoiding using beams that correspond to the unintended directions. In certain embodiments, the means 1716 for avoiding using beams that correspond to the unintended directions can be configured to perform one or more of the function described in operation block 1416 of method 1400 (FIG. 14). In an exemplary embodiment, the means 1716 for avoiding using beams that correspond to the unintended directions may comprise the base station 610 and/or the UE 650 avoiding the transmission of communication beams in the unintended directions, or above a certain power level, using, for example, the controller/processor 675, memory 676, TX processor 616, transmitter 618, the controller/processor 659, memory 660, TX processor 668, transmitter 654, and related circuitry (FIG. 6).

Figure 18:
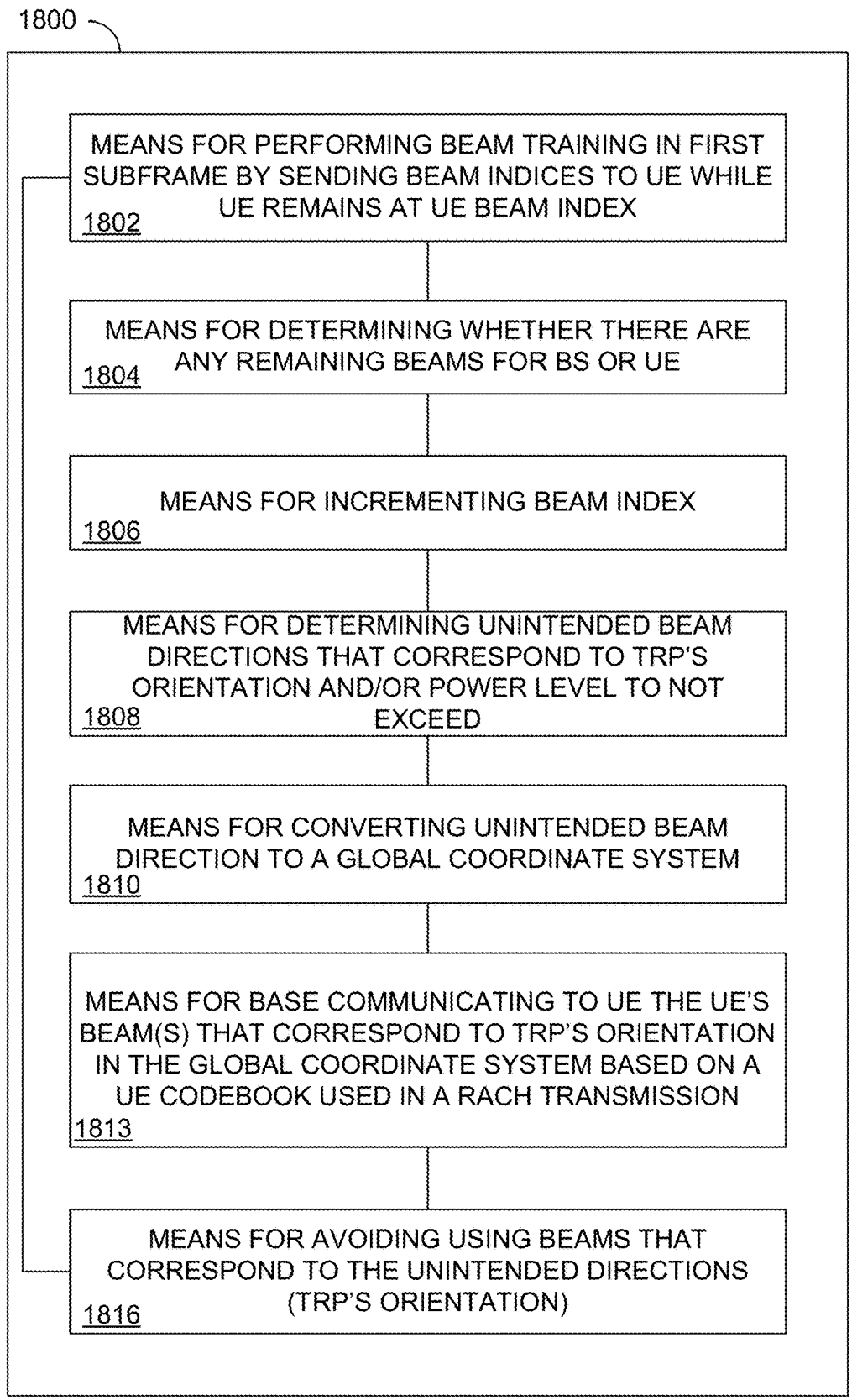
FIG. 18 is a functional block diagram of an apparatus for a communication system in accordance with various aspects of the present disclosure.

FIG. 18 is a functional block diagram of an apparatus 1800 for a communication system in accordance with various aspects of the present disclosure. The apparatus 1800 comprises means 1802 for performing a beam training sequence, where the base station communicates beam index information to the UE in a first subframe, while the UE remains on a first UE beam index for that subframe. In certain embodiments, the means 1802 for performing a beam training sequence, where the base station communicates beam index information to the UE in a first subframe, while the UE remains on a first UE beam index for that subframe can be configured to perform one or more of the function described in operation block 1502 of method 1500 (FIG. 15). In an exemplary embodiment, the means 1802 for performing a beam training sequence, where the base station communicates beam index information to the UE in a first subframe, while the UE remains on a first UE beam index for that subframe may comprise the base station 610 sending beam index information to a UE 650 using, for example, the controller/processor 675, memory 676, TX processor 616, transmitter 618, and related circuitry (FIG. 6).

The apparatus 1800 further comprises means 1804 for determining whether there are any remaining beams for the base station or the UE. In certain embodiments, the means 1804 for determining whether there are any remaining beams for the base station or the UE can be configured to perform one or more of the function described in operation block 1504 of method 1500 (FIG. 15). In an exemplary embodiment, the means 1804 for determining whether there are any remaining beams for the base station or the UE may comprise the base station 610 and/or the UE 650 determining if any additional beam index information is present using, for example, the controller/processor 675, memory 676, TX processor 616, transmitter 618, the controller/processor 659, memory 660, TX processor 668, transmitter 654, and related circuitry (FIG. 6).

The apparatus 1800 further comprises means 1806 for incrementing a beam index. In certain embodiments, the means 1806 for incrementing a beam index can be configured to perform one or more of the function described in operation block 1506 of method 1500 (FIG. 15). In an exemplary embodiment, the means 1806 for incrementing a beam index may comprise the UE 650 incrementing its beam index using, for example, the controller/processor 659, memory 660, TX processor 668, transmitter 654, and related circuitry (FIG. 6).

The apparatus 1800 further comprises means 1808 for determining unintended beam directions that correspond to a TRP's orientation and/or a power level not to be exceeded. In certain embodiments, the means 1808 for determining unintended beam directions that correspond to a TRP's orientation and/or a power level not to be exceeded can be configured to perform one or more of the function described in operation block 1508 of method 1500 (FIG. 15). In an exemplary embodiment, the means 1808 for determining unintended beam directions that correspond to a TRP's orientation and/or a power level not to be exceeded may comprise the base station 610 determining which of its and which of a UEs communication beams may interfere with a TRP, using, for example, the controller/processor 675, memory 676, TX processor 616, transmitter 618, and related circuitry (FIG. 6).

The apparatus 1800 further comprises means 1810 for converting the unintended beam direction to coordinates in a global coordinate system (GCS). In certain embodiments, the means 1810 for converting the unintended beam direction to coordinates in a global coordinate system (GCS) can be configured to perform one or more of the function described in operation block 1510 of method 1500 (FIG. 15). In an exemplary embodiment, the means 1810 for converting the unintended beam direction to coordinates in a global coordinate system (GCS) may comprise the base station 610 converting a UEs communication beams into coordinates related to a GCS, using, for example, the controller/processor 675, memory 676, TX processor 616, transmitter 618, and related circuitry (FIG. 6).

The apparatus 1800 further comprises means 1813 for communicating to a UE the UEs beams that correspond to an unintended direction, such as the orientation of a TRP, in a global coordinate system (GCS) based on a UE codebook used in a random access channel (RACH) transmission. In certain embodiments, the means 1813 for communicating to a UE the UEs beams that correspond to an unintended direction, such as the orientation of a TRP, in a GCS based on a UE codebook used in a RACH transmission can be configured to perform one or more of the function described in operation block 1513 of method 1500 (FIG. 15). In an exemplary embodiment, the means 1813 for communicating to a UE the UEs beams that correspond to an unintended direction, such as the orientation of a TRP, in a GCS based on a UE codebook used in a RACH transmission may comprise the base station 610 transmitting to a UE the UEs unintended beam directions based on a EU codebook in a RACH transmission, using, for example, the controller/processor 675, memory 676, TX processor 616, transmitter 618, and related circuitry (FIG. 6).

The apparatus 1800 further comprises means 1816 for avoiding using beams that correspond to the unintended directions. In certain embodiments, the means 1816 for avoiding using beams that correspond to the unintended directions can be configured to perform one or more of the function described in operation block 1516 of method 1500 (FIG. 15). In an exemplary embodiment, the means 1816 for avoiding using beams that correspond to the unintended directions may comprise the base station 610 and/or the UE 650 avoiding the transmission of communication beams in the unintended directions, or above a certain power level, using, for example, the controller/processor 675, memory 676, TX processor 616, transmitter 618, the controller/processor 659, memory 660, TX processor 668, transmitter 654, and related circuitry (FIG. 6).

Figure 19:
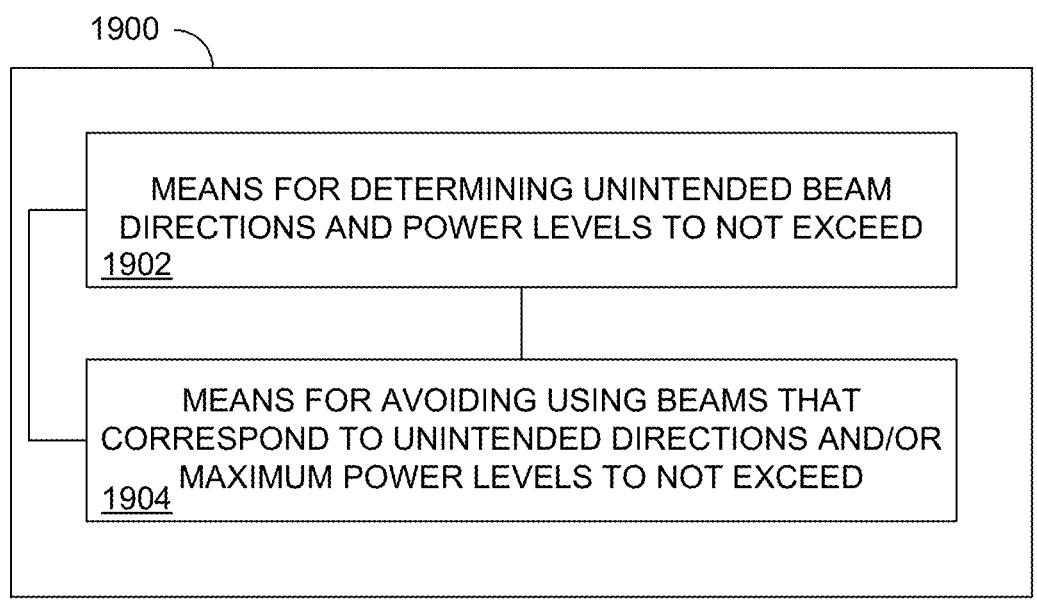
FIG. 19 is a functional block diagram of an apparatus for a communication system in accordance with various aspects of the present disclosure.

FIG. 19 is a functional block diagram of an apparatus 1900 for a communication system in accordance with various aspects of the present disclosure. The apparatus 1900 comprises means 1902 for determining an unintended beam direction and a power level not to be exceeded. In certain embodiments, the means 1902 for determining an unintended beam direction and a power level not to be exceeded can be configured to perform one or more of the function described in operation block 1602 of method 1600 (FIG. 16). In an exemplary embodiment, the means 1902 for determining an unintended beam direction and a power level not to be exceeded may comprise the UE 650 using data obtained from one or more sensors to determine an unintended beam direction and a power level not to be exceeded using, for example, the controller/processor 659, memory 660, TX processor 668, sensor element 669, and related circuitry (FIG. 6).

The apparatus 1900 further comprises means 1904 for avoiding using communication beams that correspond to the unintended beam direction and the power level not to be exceeded. In certain embodiments, the means 1904 for avoiding using communication beams that correspond to the unintended beam direction and the power level not to be exceeded can be configured to perform one or more of the function described in operation block 1604 of method 1600 (FIG. 16). In an exemplary embodiment, the means 1904 for avoiding using communication beams that correspond to the unintended beam direction and the power level not to be exceeded may comprise the UE 650 using data obtained from one or more sensors to determine an unintended beam direction and a power level not to be exceeded using, for example, the controller/processor 659, memory 660, TX processor 668, sensor element 669, and related circuitry (FIG. 6).

Figure 20:
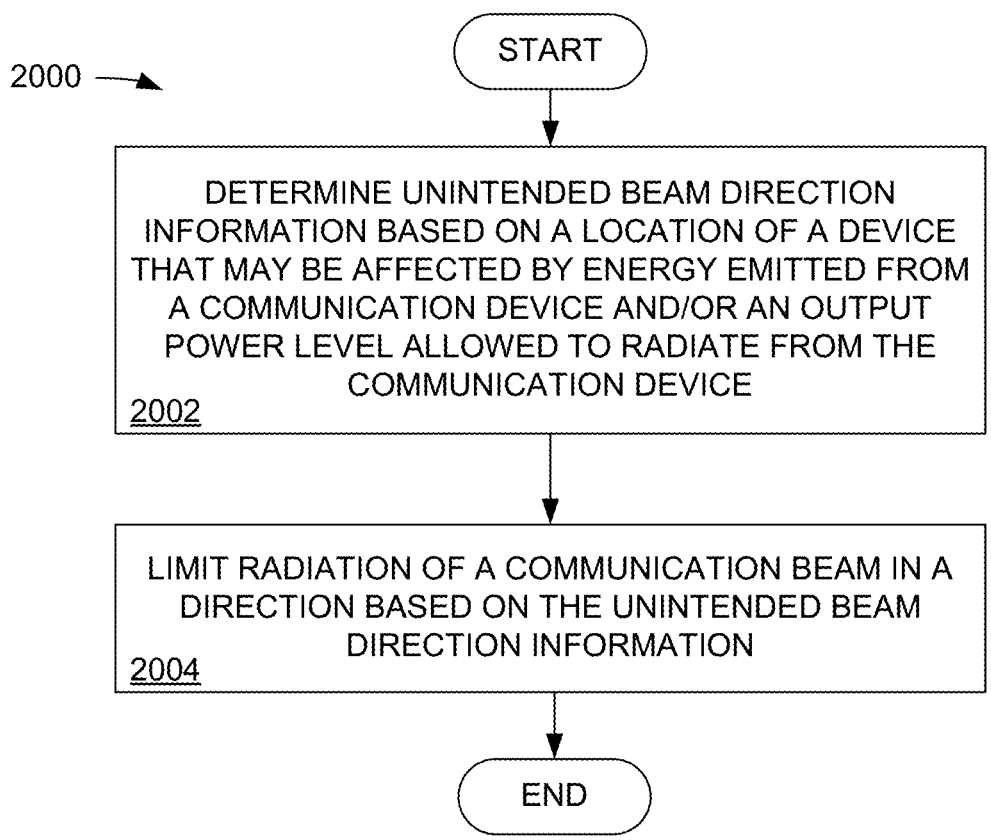
FIG. 20 is a flow chart illustrating an example of a method for communication, in accordance with various aspects of the present disclosure.

FIG. 20 is a flow chart illustrating an example of a method for communication, in accordance with various aspects of the present disclosure. The blocks in the method 2000 can be performed in or out of the order shown, and in some embodiments, can be performed at least in part in parallel.

In block 2002, a communication device may determine unintended beam direction information based on one or more of a location of a device that may be affected by energy emitted from the communication device and an output power level allowed to radiate from the communication device.

In block 2004, the communication device limits radiation of a communication beam in a direction based on the unintended beam direction information.

Figure 21:
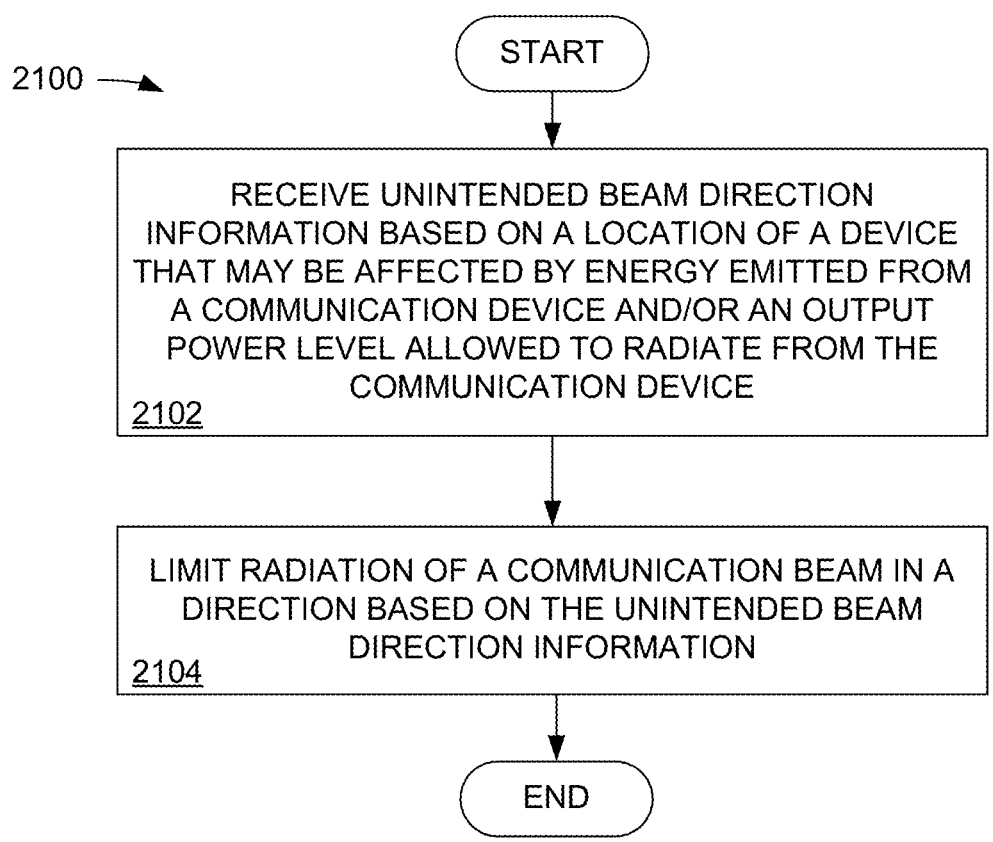
FIG. 21 is a flow chart illustrating an example of a method for communication, in accordance with various aspects of the present disclosure.

FIG. 21 is a flow chart illustrating an example of a method for communication, in accordance with various aspects of the present disclosure. The blocks in the method 2100 can be performed in or out of the order shown, and in some embodiments, can be performed at least in part in parallel.

In block 2102, a communication device may receive unintended beam direction information based on one or more of a location of a device that may be affected by energy emitted from the communication device and an output power level allowed to radiate from the communication device.

In block 2104, the communication device limits radiation of a communication beam in a direction based on the unintended beam direction information.

Figure 22:
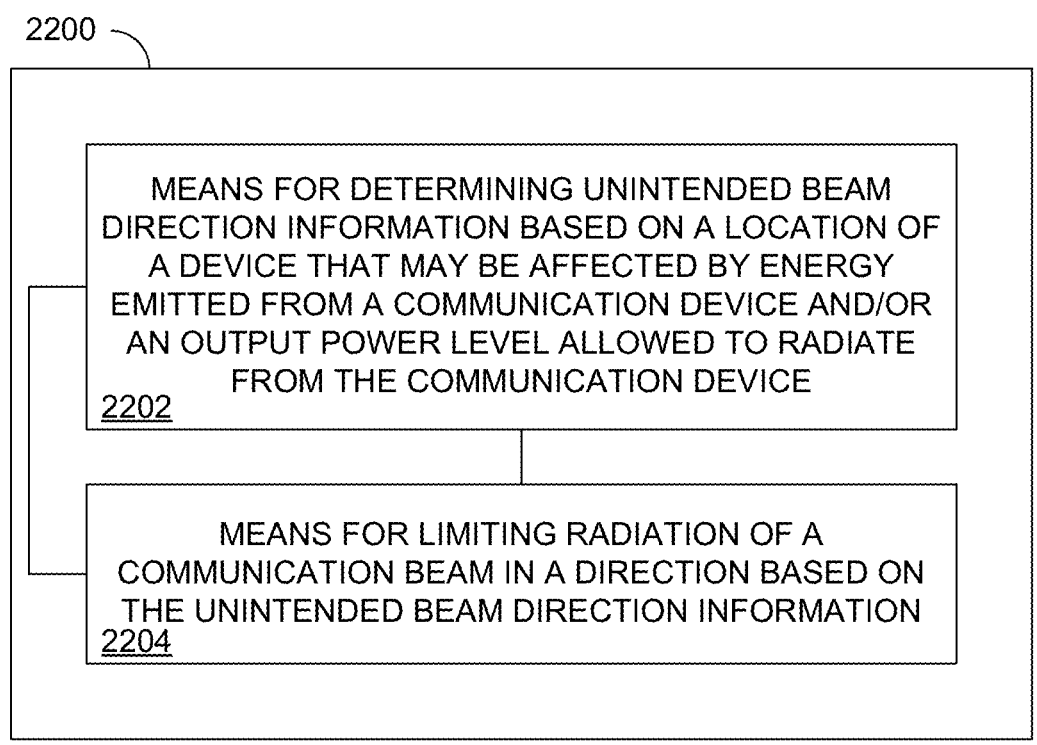
FIG. 22 is a functional block diagram of an apparatus for a communication system in accordance with various aspects of the present disclosure.

FIG. 22 is a functional block diagram of an apparatus 2200 for a communication system in accordance with various aspects of the present disclosure. The apparatus 2200 comprises means 2202 for determining unintended beam direction information based on one or more of a location of a device that may be affected by energy emitted from the communication device and an output power level allowed to radiate from the communication device. In certain embodiments, the means 2202 for determining unintended beam direction information based on one or more of a location of a device that may be affected by energy emitted from the communication device and an output power level allowed to radiate from the communication device can be configured to perform one or more of the function described in operation block 2002 of method 2000 (FIG. 20). In an exemplary embodiment, the means 2202 for determining unintended beam direction information based on one or more of a location of a device that may be affected by energy emitted from the communication device and an output power level allowed to radiate from the communication device may comprise the base station 610 or the UE 650 determining an unintended beam direction and a power level not to be exceeded using, for example, the controller/processor 659 or 675, memory 660 or 676, TX processor 668 or 616, sensor element 669, and related circuitry (FIG. 6).

The apparatus 2200 further comprises means 2204 for limiting radiation of a communication beam in a direction based on the unintended beam direction information. In certain embodiments, the means 2204 for limiting radiation of a communication beam in a direction based on the unintended beam direction information can be configured to perform one or more of the function described in operation block 2004 of method 2000 (FIG. 20). In an exemplary embodiment, the means 2204 for limiting radiation of a communication beam in a direction based on the unintended beam direction information may comprise the base station 610 or the UE 650 using the unintended beam direction information to limit or prevent the radiation of energy in a particular direction using, for example, the controller/processor 659 or 675, memory 660 or 676, TX processor 668 or 616, sensor element 669, and related circuitry (FIG. 6).

Figure 23:
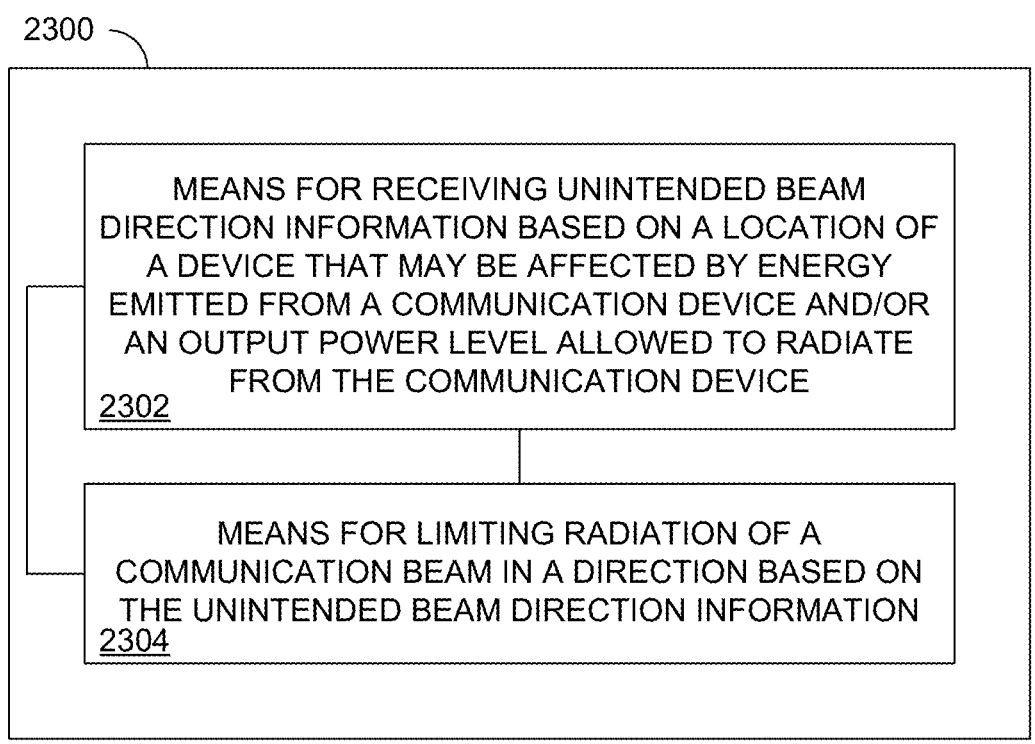
FIG. 23 is a functional block diagram of an apparatus for a communication system in accordance with various aspects of the present disclosure.

FIG. 23 is a functional block diagram of an apparatus 2300 for a communication system in accordance with various aspects of the present disclosure. The apparatus 2300 comprises means 2302 for receiving unintended beam direction information based on one or more of a location of a device that may be affected by energy emitted from the communication device and an output power level allowed to radiate from the communication device. In certain embodiments, the means 2302 for receiving unintended beam direction information based on one or more of a location of a device that may be affected by energy emitted from the communication device and an output power level allowed to radiate from the communication device can be configured to perform one or more of the function described in operation block 2102 of method 2100 (FIG. 21). In an exemplary embodiment, the means 2302 for receiving unintended beam direction information based on one or more of a location of a device that may be affected by energy emitted from the communication device and an output power level allowed to radiate from the communication device may comprise the UE 650 receiving an unintended beam direction and a power level not to be exceeded using, for example, the controller/processor 659, memory 660, RX processor 656, and related circuitry (FIG. 6).

The apparatus 2300 further comprises means 2304 for limiting radiation of a communication beam in a direction based on the unintended beam direction information. In certain embodiments, the means 2304 for limiting radiation of a communication beam in a direction based on the unintended beam direction information can be configured to perform one or more of the function described in operation block 2104 of method 2100 (FIG. 21). In an exemplary embodiment, the means 2304 for limiting radiation of a communication beam in a direction based on the unintended beam direction information may comprise the UE 650 using the unintended beam direction information to limit or prevent the radiation of energy in a particular direction using, for example, the controller/processor 659, memory 660, TX processor 668, and related circuitry (FIG. 6).

In an exemplary embodiment, this disclosure provides a method for each base station to communicate to each UE an unintended communication beam direction, an interference avoidance/beam nulling region, and/or admissible or allowable power levels in those regions.

The interference avoidance/beam nulling region could be a collection of angles in azimuth and/or zenith (elevation) relative to an absolute global coordinate system (GCS) from which the UE may determine a corresponding collection of angles in azimuth and/or zenith (elevation) relative to its own local coordinate system (LCS).

The interference avoidance/beam nulling region could be based on a base stations', or other communication devices' historic or prior knowledge of a certain UE or other communication device side beam index from uplink/sounding reference signal (UL/SRS) transmissions that determine an appropriate collection of beam direction(s).

Admissible or allowable power levels can be across multiple frequency bands/sub-bands.

Such power levels can be provided on an absolute scale (dBm) or relative to reference signal received power/received signal strength indication (RSRP/RSSI) levels corresponding to template/training beams in certain known directions.

If a base station fails to provide an allowable power level, a UE or other communication device may determine the allowable power level and an associated weighting factor, γ, for beam design from prior knowledge or based on a default setting.

In an exemplary embodiment, this disclosure provides a method for a UE or other communication device to use sensors to determine admissible or allowable power levels in particular directions based on maximum permissible exposure (MPE) constraints.

The UE or other communication device may combine both interference avoidance constraints and MPE constraints appropriately to develop a communication beam, or to develop information on where not to emit energy.

In an exemplary embodiment, this disclosure provides a method for a UE or other communication device to incorporate the unintended beam direction, beam nulling region and admissible or allowable power information in those regions as well as a desired region for the beam's excitation direction(s) to determine an appropriate beam via an online beam design optimization criterion. As used herein, the term "online" beam design refers to a communication beam designed just prior to signaling transmission using the designed beam. In contrast, as used herein, the term "offline" beam design refers to the design of a class of communication beams during the beam characterization/calibration process with the factory settings and selection of the correct beam from this offline designed codebook based on feedback information.

The UE or other communication device may determine an appropriate weighting factor γ to use in the beam design optimization.

The UE or other communication device may choose to override this determination by setting γ=0 and thus focus only on the gain of the antenna array in the intended direction(s).

The UE or other communication device may design a class of such beams in the intended direction offline and select the best beam from this class based on unintended beam direction, beam nulling region and admissible or allowable power information in those regions.

In an exemplary embodiment, the term "communication beam" or "intended communication beam" or "intended communication beam direction" refers to the correct set of antenna weights to be used to realize the desired objective.

Antenna element weights may comprise amplitudes and phases derived from a quantized set with a phase shifter being B bits where B can depend on a signal-to-noise ratio (SNR) estimate.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed and/or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for communication by a communication device, comprising:
   determining unintended beam direction information based on at least one of a location of a device that may be affected by energy emitted from the communication device, or an output power level allowed to radiate from the communication device, wherein the output power level is based on a maximum permissible exposure (MPE) constraint;
   limiting radiation of a communication beam from the communication device in a direction based on the unintended beam direction information; and
   combining the unintended beam direction information and the MPE constraint to determine a communication beam direction and a power level for an intended communication beam.

2. The method of claim 1, wherein the unintended beam direction information comprises a first collection of angles in azimuth and zenith relative to an absolute global coordinate system (GCS) from which the communication device determines a second collection of angles in azimuth and zenith relative to a local coordinate system (LCS).

3. The method of claim 1, wherein the unintended beam direction information may be based on historic or prior knowledge of the communication device's beam index from an uplink/sounding reference signal (UL/SRS) transmission.

4. The method of claim 1, wherein the output power level in an unintended beam direction may occur across multiple frequency bands or sub-bands.

5. The method of claim 1, wherein the output power level in an unintended beam direction is provided on at least one of an absolute scale (dBm) and relative to reference signal received power/received signal strength indication (RSRP/RSSI) levels corresponding to template/training beams in certain known directions.

6. The method of claim 1, further comprising the communication device determining the output power level and an associated weighting factor, γ, for beam design from prior knowledge or based on a default setting.

7. The method of claim 1, wherein determining unintended beam direction information comprises receiving the unintended beam direction information in a communication message.

8. The method of claim 1, wherein the communication device is a base station or a user equipment.

9. A communication device, comprising:
a processor;
memory coupled with the processor; and
instructions stored in the memory and operable, when executed by the processor, to cause the communication device to:
determine unintended beam direction information based on at least one of a location of a device that may be affected by energy emitted from the communication device, or an output power level allowed to radiate from the communication device, wherein the output power level allowed to radiate from the communication device is based on a maximum permissible exposure (MPE) constraint;
limit radiation of a communication beam from the communication device in a direction based on the unintended beam direction information; and
combine the unintended beam direction information and the MPE constraint to determine a communication beam direction and a power level for an intended communication beam.

10. The communication device of claim 9, wherein the unintended beam direction information comprises a first collection of angles in azimuth and zenith relative to an absolute global coordinate system (GCS) from which the communication device determines a second collection of angles in azimuth and zenith relative to a local coordinate system (LCS).

11. The communication device of claim 9, wherein the unintended beam direction information may be based on historic or prior knowledge of the communication device's beam index from an uplink/sounding reference signal (UL/SRS) transmission.

12. The communication device of claim 9, wherein the output power level in an unintended beam direction may occur across multiple frequency bands or sub-bands.

13. The communication device of claim 9, wherein the output power level in an unintended beam direction is provided on at least one of an absolute scale (dBm) and relative to reference signal received power/received signal strength indication (RSRP/RSSI) levels corresponding to template/training beams in certain known directions.

14. The communication device of claim 9, further comprising instructions stored in the memory and operable, when executed by the processor, to cause the communication device to determine the output power level and an associated weighting factor, γ, for beam design from prior knowledge or based on a default setting.

15. The communication device of claim 9, further comprising instructions stored in the memory and operable, when executed by the processor, to cause the communication device to receive the unintended beam direction information in a communication message.

16. The system of claim 9, wherein the communication device is a base station or a user equipment.

17. A device for communication, comprising:
means for determining unintended beam direction information based on at least one of a location of a device that may be affected by energy emitted from the communication device, or an output power level allowed to radiate from the communication device, wherein the output power level is based on a maximum permissible exposure (MPE) constraint;
means for limiting radiation of a communication beam from the communication device in a direction based on the unintended beam direction information; and
means for combining the unintended beam direction information and the MPE constraint to determine a communication beam direction and a power level for an intended communication beam.

18. The device of claim 17, further comprising means for receiving the unintended beam direction information in a communication message.

* * * * *